(12) United States Patent
Moeglein et al.

(10) Patent No.: US 9,405,972 B2
(45) Date of Patent: Aug. 2, 2016

(54) EXTERIOR HYBRID PHOTO MAPPING

(71) Applicant: QUALCOMM Incorporated, San Diego, CA (US)

(72) Inventors: Mark Leo Moeglein, Ashland, OR (US); Christopher Brunner, San Diego, CA (US); Arvind Ramanandan, San Diego, CA (US); Mahesh Ramachandran, San Jose, CA (US); Abhishek Tyagi, San Diego, CA (US); Murali Ramaswamy Chari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/497,235

(22) Filed: Sep. 25, 2014

(65) Prior Publication Data
US 2015/0094952 A1 Apr. 2, 2015

Related U.S. Application Data

(60) Provisional application No. 61/883,921, filed on Sep. 27, 2013.

(51) Int. Cl.
*G01S 1/00* (2006.01)
*G06K 9/00* (2006.01)
(Continued)

(52) U.S. Cl.
CPC ............ *G06K 9/00671* (2013.01); *G01C 21/00* (2013.01); *G01C 21/165* (2013.01);
(Continued)

(58) Field of Classification Search
CPC ..... G05D 1/0251; G05D 1/027; G01C 11/02; G01C 21/00; G06T 7/0065; G06T 67/602; G06T 7/0024; G06T 7/0048
See application file for complete search history.

(56) References Cited

U.S. PATENT DOCUMENTS 7,848,881 B2  12/2010  Tan et al.
8,320,939 B1  11/2012  Vincent
(Continued)

FOREIGN PATENT DOCUMENTS

WO  0034803 A2  6/2000
WO  2008024772 A1  2/2008
(Continued)

OTHER PUBLICATIONS

Jones E.S., et al., "Visual-Inertial Navigation, Mapping and Localization: A Scalable Real-Time Causal Approach," International Journal of Robotics Research, Sep. 23, 2010, pp. 1-38.
(Continued)

*Primary Examiner* — Michael D Lang
(74) *Attorney, Agent, or Firm* — Silicon Valley Patent Group LLP

(57) ABSTRACT

Embodiments disclosed pertain to the use of user equipment (UE) for the generation of a 3D exterior envelope of a structure based on captured images and a measurement set associated with each captured image. In some embodiments, a sequence of exterior images of a structure is captured and a corresponding measurement set comprising Inertial Measurement Unit (IMU) measurements, wireless measurements (including Global Navigation Satellite System (GNSS) measurements) and/or other non-wireless sensor measurements may be obtained concurrently. A closed-loop trajectory of the UE in global coordinates may be determined and a 3D structural envelope of the structure may be obtained based on the closed loop trajectory and feature points in a subset of images selected from the sequence of exterior images of the structure.

30 Claims, 15 Drawing Sheets

(51) Int. Cl.

| | | |
|---|---|---|
| *G06T 7/60* | (2006.01) | |
| *H04W 4/02* | (2009.01) | |
| *H04W 4/04* | (2009.01) | |
| *G01C 21/00* | (2006.01) | |
| *G01S 19/13* | (2010.01) | |
| *G06T 7/20* | (2006.01) | |
| *G01C 21/20* | (2006.01) | |
| *G06T 7/00* | (2006.01) | |
| *G01C 21/16* | (2006.01) | |
| *G01C 25/00* | (2006.01) | |
| *G01S 5/02* | (2010.01) | |
| *G01S 5/16* | (2006.01) | |

(52) U.S. Cl.
CPC ............ *G01C 21/20* (2013.01); *G01C 21/206* (2013.01); *G01C 25/005* (2013.01); *G01S 19/13* (2013.01); *G06T 7/0018* (2013.01); *G06T 7/2046* (2013.01); *G06T 7/60* (2013.01); *H04W 4/028* (2013.01); *H04W 4/043* (2013.01); *G01S 5/0263* (2013.01); *G01S 5/0294* (2013.01); *G01S 5/16* (2013.01); *G01S 5/163* (2013.01); *G06T 2207/10004* (2013.01); *G06T 2207/10016* (2013.01); *G06T 2207/30212* (2013.01); *G06T 2207/30244* (2013.01); *G06T 2207/30252* (2013.01); *H04M 2250/12* (2013.01); *H04M 2250/52* (2013.01)

(56) References Cited

U.S. PATENT DOCUMENTS

| | | | |
|---|---|---|---|
| 8,510,041 | B1 * | 8/2013 | Anguelov et al. ............ 701/445 |
| 8,532,885 | B1 | 9/2013 | Whitehead |
| 8,626,198 | B2 | 1/2014 | Das et al. |
| 9,148,764 | B2 | 9/2015 | Das et al. |
| 2004/0001647 | A1 | 1/2004 | Lake et al. |
| 2004/0168148 | A1 | 8/2004 | Goncalves et al. |
| 2007/0021126 | A1 | 1/2007 | Nanda et al. |
| 2007/0224977 | A1 | 9/2007 | Yamaguchi et al. |
| 2007/0276590 | A1 | 11/2007 | Leonard et al. |
| 2008/0223131 | A1 | 9/2008 | Vannucci et al. |
| 2009/0248304 | A1 | 10/2009 | Roumeliotis et al. |
| 2010/0008337 | A1 | 1/2010 | Bajko |
| 2010/0125409 | A1 | 5/2010 | Prehofer |
| 2010/0178934 | A1 | 7/2010 | Moeglein et al. |
| 2010/0255856 | A1 | 10/2010 | Kansal et al. |
| 2011/0025555 | A1 | 2/2011 | Whitehead |
| 2011/0081918 | A1 | 4/2011 | Burdo et al. |
| 2011/0172906 | A1 | 7/2011 | Das et al. |
| 2011/0178708 | A1 | 7/2011 | Zhang et al. |
| 2011/0249152 | A1 | 10/2011 | Lindsay et al. |
| 2012/0021762 | A1 | 1/2012 | Garin et al. |
| 2012/0121161 | A1 | 5/2012 | Eade et al. |
| 2012/0130762 | A1 | 5/2012 | Gale et al. |
| 2012/0190379 | A1 | 7/2012 | Hassan et al. |
| 2012/0303255 | A1 | 11/2012 | Wong et al. |
| 2013/0083964 | A1 | 4/2013 | Morris et al. |
| 2013/0093852 | A1 | 4/2013 | Ye |
| 2013/0100282 | A1 | 4/2013 | Siercks |
| 2013/0138247 | A1 | 5/2013 | Gutmann et al. |
| 2013/0182891 | A1 | 7/2013 | Ling |
| 2013/0201365 | A1 | 8/2013 | Wirola et al. |
| 2013/0202197 | A1 | 8/2013 | Reeler et al. |
| 2013/0222369 | A1 | 8/2013 | Huston et al. |
| 2013/0244693 | A1 | 9/2013 | Das et al. |
| 2013/0342391 | A1 | 12/2013 | Hoang et al. |
| 2014/0126769 | A1 | 5/2014 | Reitmayr et al. |
| 2015/0092048 | A1 | 4/2015 | Brunner |
| 2015/0094089 | A1 | 4/2015 | Moeglein |

FOREIGN PATENT DOCUMENTS

| | | |
|---|---|---|
| WO | 2013040411 A1 | 3/2013 |
| WO | 2013108243 A1 | 7/2013 |

OTHER PUBLICATIONS

International Search Report and Written Opinion—PCT/US2014/057723—ISA/EPO—Jun. 17, 2015.

* cited by examiner

|  | Outdoor Availability | Precision | Global Availability | Power Consumption |
|---|---|---|---|---|
| Satellite | Excellent | Good | Excellent | Fair |
| Inertial | Excellent | Good | N/A | Fair |
| Photo | Fair | Excellent | N/A | Fair |
| WAN | Good | Fair | Good | Good |
| LAN/Beacons | Fair | Good | Good | Fair |

FIG. 3A

|  | Outdoor Ambiguity | Outdoor Precision | Time Stitching | Signal Strength |
|---|---|---|---|---|
| Satellite | Low | High | LOS | Weak |
| Inertial | N/A | Medium | Excellent | N/A |
| Photo | High | High | Good | N/A |
| WAN | Low | Medium | Fair | Strong |
| LAN/Beacons | Low | Medium | Fair | Varies |

EXTERIOR HYBRID PHOTO MAPPING

CROSS REFERENCE TO RELATED APPLICATIONS

This application claims the benefit of and priority to U.S. Provisional Application No. 61/883,921 entitled "Off-Target Tracking Using Feature Aiding in the Context of Inertial Navigation," filed Sep. 27, 2013, which is incorporated by reference in its entirety herein.

FIELD

The subject matter disclosed herein relates generally to terrestrial positioning systems, and in particular, to systems and methods for exterior hybrid photo mapping.

BACKGROUND

Mapping techniques are increasingly moving away from government maps based on satellite imagery and photogrammetry to detailed localized maps. A majority of current outdoor mapping strategies are focused on the use of heavily instrumented and expensive "war driving" vans capable of collecting large amounts of data. However, the data collected by war driving vans is often proprietary and unavailable to the vast majority of mobile device users. In addition, because the use of war driving vans is limited to areas with vehicular access, many locations frequented by users cannot be mapped.

Further, attempts to use a combination of GPS receivers, cameras and online cartography tools for mapping have been limited and cumbersome. In addition, there has been no significant attempt to map the exterior of outdoor structures such as by determining the size, three dimensional (3D) shape, orientation and position of structures. The sheer number of structures makes traditional mapping techniques impractical. On the other hand, the number of such unmapped structures leaves a void that limits detail in local maps. Moreover, because structures are constantly torn down, remodeled, updated or rebuilt, keeping accurate updated maps of the exterior of outdoor structures is often cost prohibitive.

Therefore, there is a need for coherent strategies to cost-effectively acquire and maintain exterior maps of structures.

SUMMARY

In some embodiments, a method on a user equipment (UE) may comprise: capturing a plurality of images of the exterior of a structure when traversing a plurality of locations in the vicinity of the structure; capturing a plurality of measurement sets, wherein each measurement set corresponds to at least one image and comprises at least one of Inertial Measurement Unit (IMU) measurements or available wireless measurements with correction information for the wireless measurements; and estimating, based, in part, on the captured images and the corresponding plurality of measurement sets, a 3D structural envelope of the structure and a trajectory of the UE. In some embodiments, the estimated trajectory of the UE, and one or more of the 3D structural envelope, captured images, or the corresponding measurement sets, may be sent to a server wirelessly coupled to the UE; and a corrected trajectory of the UE and a 3D structural envelope of the structure registered to absolute coordinates may be received from the server, wherein the received corrected trajectory is based, in part, on the estimated trajectory of the UE, captured images and/or measurement sets.

In another aspect, a User Equipment (UE) may comprise: a camera configured to capture a plurality of images of the exterior of a structure when traversing a plurality of locations in the vicinity of the structure; a plurality of sensors, the sensors comprising an Inertial Measurement Unit (IMU); a wireless module configured to take measurements of available wireless signals, and acquire correction information for the wireless measurements; and a processor, coupled to the camera, sensors and wireless module. Further, the processor may be configured to: obtain the plurality of images of the exterior of a structure; obtain a plurality of measurement sets, wherein each measurement set corresponds to at least one image in the plurality of images, and each measurement set comprises at least one of IMU measurements and available wireless measurements with correction information for the wireless measurements; estimate, based, in part, on the captured images and the corresponding plurality of measurement sets, a 3D structural envelope of the structure and a trajectory of the UE; send the estimated trajectory of the UE, and one or more of the 3D structural envelope, captured images, or the corresponding measurement sets, to a server wirelessly coupled to the UE; and receive, based, in part, on the estimated trajectory of the UE, captured images and measurement sets, a corrected trajectory of the UE and a 3D structural envelope of the structure registered to absolute coordinates.

In a further aspect, a User Equipment (UE) may comprise: imaging means configured to capture a plurality of images of the exterior of a structure when traversing a plurality of locations in the vicinity of the structure; sensing means, the sensing means comprising an Inertial Measurement Unit (IMU) means; wireless measurement means configured to take measurements of available wireless signals, and acquire correction information for the wireless measurements; means for obtaining the plurality of images of the exterior of a structure; means for obtaining a plurality of measurement sets, wherein each measurement set corresponds to at least one image in the plurality of images, and each measurement set comprises at least one of IMU measurements and available wireless measurements with correction information for the wireless measurements; means for estimating, based, in part, on the captured images and the corresponding plurality of measurement sets, a 3D structural envelope of the structure and a trajectory of the UE; means for sending the estimated trajectory of the UE, and one or more of the 3D structural envelope, captured images, or the corresponding measurement sets, to a server wirelessly coupled to the UE; and means for receiving, based, in part, on the estimated trajectory of the UE, captured images and measurement sets, a corrected trajectory of the UE and a 3D structural envelope of the structure registered to absolute coordinates.

In some embodiments, a non-transitory computer-readable medium may comprise instructions, which, when executed by a processor, cause the processor to be configured to: capture a plurality of images of the exterior of a structure when traversing a plurality of locations in the vicinity of the structure; capture a plurality of measurement sets, wherein each measurement set corresponds to at least one image and comprises at least one of Inertial Measurement Unit (IMU) measurements or available wireless measurements with correction information for the wireless measurements; estimate, based, in part, on the captured images and the corresponding plurality of measurement sets, a 3D structural envelope of the structure and a trajectory of the UE; send the estimated trajectory of the UE, and one or more of the 3D structural envelope, captured images, or the corresponding measurement sets, to a server wirelessly coupled to the UE; and receive, based, in part, on the estimated trajectory of the UE, captured images and measurement sets, a corrected trajectory of the UE and a 3D structural envelope of the structure registered to absolute coordinates.

The methods disclosed may be performed by one or more UE's such as servers (including location servers), mobile stations, mobile devices, etc. using LPP, LPPe or other protocols. Embodiments disclosed also relate to software, firmware, and program instructions created, stored, accessed, read or modified by processors using non transitory computer readable media or computer readable memory.

BRIEF DESCRIPTION OF THE DRAWINGS

FIGS. 3A and 3B show tables indicating the availability of different positioning techniques in a variety of situations along with associated location precision, positioning ambiguity, and power consumption.

DETAILED DESCRIPTION

The terms "User Device" (UD) or "user equipment" (UE) or are used interchangeably herein and may refer to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The terms are also intended to include devices which communicate with a personal navigation device (PND), such as by short-range wireless, infrared, wireline connection, or other connection—regardless of whether satellite signal reception, assistance data reception, and/or position-related processing occurs at the device or at the PND. The UE may represent a mobile telephone, notepad computer or laptop, or it may be a vehicle that collects said measurement sets for the purpose of creating street maps and/or the delay and/or signal strength maps herein.

In addition, the terms UD, UE, "mobile station" "mobile device" or "target" are intended to include all devices, including wireless and wireline communication devices, computers, laptops, etc. which are capable of communication with a server, such as via the Internet, Wi-Fi, cellular wireless network, DSL network, packet cable network or other network, and regardless of whether satellite signal reception, assistance data reception, and/or position-related processing occurs at the device, at a server, or at another device associated with the network. Any operable combination of the above are also considered a "user device."

Figure 1A:
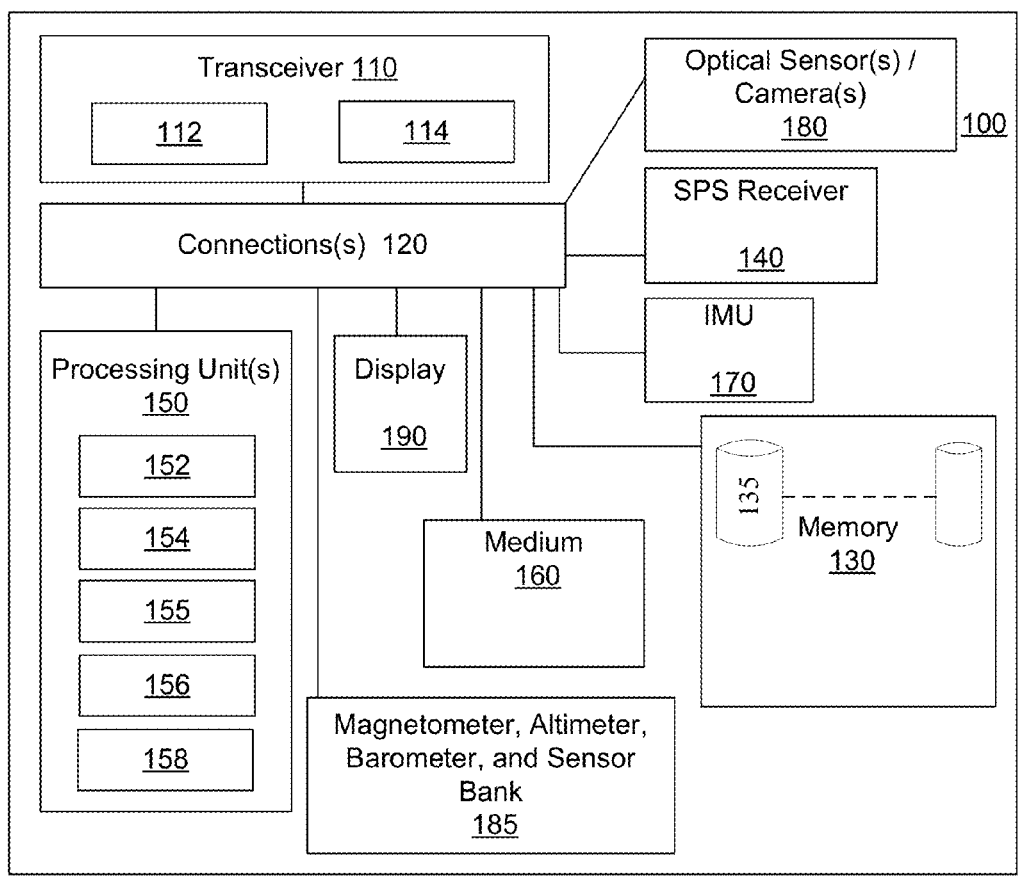
FIG. 1A shows a schematic block diagram illustrating certain exemplary features of an UE enabled to support hybrid photo navigation and mapping in a manner consistent with disclosed embodiments.

FIG. 1A shows a schematic block diagram illustrating certain exemplary features of UE 100 enabled to support mapping based on a combination of wireless signal and sensor based measurements, including camera or other image based techniques. Further, in some embodiments, UE 100 may also support hybrid photo mapping by combining image based techniques with wireless signal and/or sensor based techniques. The term "hybrid" is used to refer to the use of a combination of one or more of sensor based, image based, and/or wireless signal based techniques to perform mapping and exterior structural envelope determination in a manner consistent with embodiments disclosed herein. In some embodiments, UE 100 may support hybrid photo mapping. In some embodiments UE 100 may further support hybrid photo navigation and location determination.

UE 100 may, for example, include one or more processing units or processing unit(s) 150, memory 130, a transceiver 110 (e.g., wireless network interface), and (as applicable) GNSS or Satellite Positioning System (SPS) receiver 140, optical sensors/camera(s) 180, magnetometer, altimeter, barometer and sensor bank 185 (collectively referred to as sensors 185), Inertial Measurement Unit (IMU) 170, non-transitory computer-readable medium 160, display 190, and memory 130, which may be operatively coupled to each other with one or more connections 120 (e.g., buses, lines, fibers, links, etc.). In certain example implementations, all or part of UE 100 may take the form of a chipset, and/or the like. The magnetometer may be capable of measuring the intensity and/or the direction of the Earth's magnetic field and may serve as a compass and/or provide an indication of a direction of travel of UE 100. The altimeter may be used to provide an indication of altitude above a calibrated level, while the barometer may provide an indication of atmospheric pressure, which may also be used to obtain a determination of altitude.

GNSS/SPS receiver 140 may be enabled to receive signals associated with one or more SPS resources. Received GNSS/SPS signals may be used to determine a position of UE 100. Transceiver 110 may, for example, include a transmitter 112 enabled to transmit one or more signals over one or more types of wireless communication networks and a receiver 114 to receive one or more signals transmitted over one or more types of wireless communication networks.

Figure 1B:
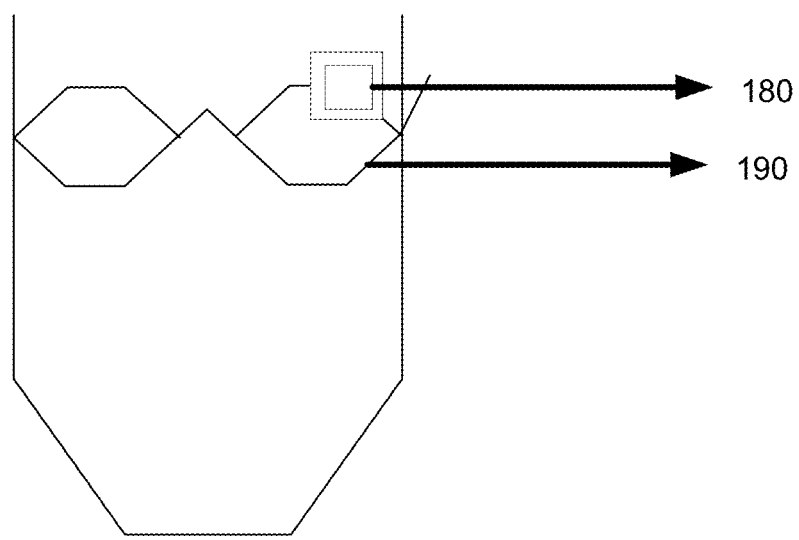
FIG. 1B shows an exemplary wearable user device.

In some embodiments, UE 100 may comprise image sensors such as CCD or CMOS sensors and/or camera(s) 180, which are hereinafter referred to as "camera(s) 180". Camera(s) 180 may convert an optical image into an electronic or digital image and may send captured images to processing unit(s) 150. For example, as shown in FIG. 1B, in some embodiments, camera(s) 180 may be housed in a wearable user device, and may be operationally coupled to display 190, processing unit(s) 150 and/or other functional units in UE 100.

In some embodiments, processing unit(s) 150 may also receive input from one or more sensors 185, which may include a magnetometer, altimeter and/or barometer. In addition, sensors 185 may include one or more of an ambient light sensor, acoustic transducers such as microphones/speakers, ultrasonic transducers and/or depth sensors, which may be used to acquire depth information and/or determine distance to a target. In general, the list of sensors above in not exhaustive and sensor bank 185 may include various other types of sensors and transducers which are increasingly being incorporated into modern smartphones and other user devices.

In some embodiments, UE 100 may also include Inertial Measurement Unit (IMU) 170. In some embodiments, IMU 170, which may comprise 3 axis accelerometer(s), 3-axis gyroscope(s), and/or magnetometer(s), may provide velocity, orientation, and/or other position related information to processing unit(s) 150. In some embodiments, IMU 170 may be configured to measure and output measured information synchronized to the capture of each image frame by camera(s) 180, and/or measurements taken by sensors 185 in UE 100. In some embodiments, the output of IMU 170 may be used by processing unit(s) 150 to determine a position and orientation of UE 100.

The term "wireless measurements" is used herein to refer to measurements of SPS, cellular, WLAN, WPAN, and other radio signals. The term "non-wireless measurements" refer to sensor measurements including (but not limited to) IMU, barometer, altimeter, and magnetometer measurements. In some embodiments, the capture of wireless measurements by a UE may be synchronized with the capture of non-wireless measurements. Further, the capture of wireless and/or non-wireless measurements can be synchronized with the capture of images by the UE. For example, measurements (wireless and/or non-wireless) and captured images may be timestamped and the measurements and images may be associated with each other based on the time stamps. The association of measurements with image and/or with each other may occur concurrently with measurement/image recordation, and/or at a later point in time based on the timestamps associated with the measurements.

The term "measurement set" is used to refer to signal measurements performed by a UE at a measurement location at a point in time or within some specified interval of a point in time. The signal measurements made may be related to mapping and/or position determination. The signal measurements made may also depend on UE 100, the capabilities of UE 100, environmental characteristics and/or signal characteristics that are available for measurement by UE 100 at a specific location/time. Typically, a measurement set may comprise image(s), wireless measurements and non-wireless measurements, where each element of the measurement set may have been recorded within some specified time interval of a point in time. The measurement sets recorded by UE 100 may be stored in memory 130 on UE 100 and/or sent to a server, where they may be processed and/or aggregated with other measurements related to that measurement location. For example, the measurement sets may stored in a Base Station Almanac (BSA) and/or used for mapping/location determination.

Processing unit(s) 150 may be implemented using a combination of hardware, firmware, and software. In some embodiments, processing unit(s) 150 may include Mapping Module (MM) 152, Navigation Module (NM) 154, and Location Assistance Data Module (LADM) 158. In some embodiments, LADM 158 may process received location assistance data to estimate a location of the UE. Location assistance data may take the form of layered map information such as multipath and visibility map assistance information, Observed Time Difference of Arrival (OTDOA) assistance information, including PRS assistance information, etc. In some embodiments, processing unit(s) 150 may also include Computer Vision Module (CVM) 155, which may implement a variety of image processing and CV functions.

The term "map layer" as used herein in refers to information, such as location assistance information, tailored to a position and position uncertainty of a UE. Each layer of the map may comprise information about a parameter, wherein the information is provided in relation to absolute or global coordinates common to the layers. In general, map layers may comprise various types of information. For example, map layers may comprise one or more of: a received signal strength map layer that correlates a received signal strength with map locations; a Signal to Noise Ratio (SNR) map layer correlating SNRs with map locations; a Forward Link Calibration (FLC) layer that correlates FLC information with map locations; etc.

In some embodiments, camera(s) 180 may include multiple cameras, front and/or rear facing cameras, wide-angle cameras, and may also incorporate CCD, CMOS, and/or other sensors. Camera(s) 180, which may be still and/or video cameras, may capture a series of 2-Dimensional (2D) still and/or video image frames of an environment and send the captured image frames to processing unit(s) 150. In some embodiments, camera(s) 180 may be a wearable camera, or an external camera, which may be operationally coupled to, but housed separately from, other functional units in UE 100. In one embodiment, images captured by camera(s) 180 may be in a raw uncompressed format and may be compressed prior to being processed and/or stored in memory 160. In some embodiments, image compression may be performed by processing unit(s) 150 (e.g. by CVM 155) using lossless or lossy compression techniques.

In some embodiments, camera 180 may be a depth sensing camera or may be coupled to depth sensors. The term "depth sensor" is used to refer to functional units that may be used to obtain depth information for an environment independently and/or in conjunction with camera(s) 180. In some embodiments, may comprise RGBD cameras, which may capture per-pixel depth (D) information when the depth sensor is enabled, in addition to color (RGB) images. As another example, in some embodiments, camera 110 may take the form of a 3D Time Of Flight (3DTOF) camera. In embodiments with 3DTOF cameras 110, the depth sensor may take the form of a strobe light coupled to the 3DTOF camera 110, which may illuminate objects in a scene and reflected light may be captured by a CCD/CMOS sensor in camera 110. Depth information may be obtained by measuring the time that the light pulses take to travel to the objects and back to the sensor.

As a further example, the depth sensor may take the form of a light source coupled to cameras 110. In one embodiment, the light source may project a structured or textured light pattern, which may consist of one or more narrow bands of light, onto objects in a scene. Depth information may then be obtained by exploiting geometrical distortions of the projected pattern caused by the surface shape of the object. In one embodiment, depth information may be obtained from stereo sensors such as a combination of an infra-red structured light projector and an infra-red camera registered to a RGB camera. In some embodiments, camera(s) 180 may be stereoscopic cameras capable of capturing 3 Dimensional (3D) images. In another embodiment, camera(s) 180 may include depth sensors that are capable of estimating depth information. For example, a depth sensor may form part of a passive stereo vision sensor, which may use two or more cameras to obtain depth information for a scene. The pixel coordinates of points common to both cameras in a captured scene may be used along with camera pose information and/or triangulation techniques to obtain per-pixel depth information. In some embodiments, depth sensors may be disabled, when not in use. For example, the depth sensor may be placed in a standby mode, or powered off when not being used. In some embodiments, processors 150 may disable (or enable) depth sensing at one or more points in time.

Processing unit(s) 150 may also execute software to process image frames captured by camera(s) 180. For example, processing unit(s) 150 may be capable of processing one or more image frames received from camera(s) 180 to determine the pose of camera(s) 180, implementing various computer vision and image processing algorithms and/or performing 3D reconstruction of an environment corresponding to an image received from camera(s) 180. The pose of camera(s) 180 refers to the position and orientation of the camera(s) 180 relative to a frame of reference. In some embodiments, camera pose may be determined for 6-Degrees Of Freedom (6-DOF), which refers to three translation components (which may be given by X,Y,Z coordinates of a frame of reference) and three angular components (e.g. roll, pitch and yaw relative to the same frame of reference).

In some embodiments, the pose of camera(s) 180 and/or UE 100 may be determined and/or tracked by processing unit(s) 150 using a visual tracking solution based on image frames captured by camera(s) 180. In some embodiments, CVM 155 may be implemented using dedicated circuitry, such as Application Specific Integrated Circuits (ASICs), Digital Signal Processors (DSPs), and/or dedicated processor (such as processing unit(s) 150). In some embodiments, CVM 155 may include functionality to communicate with one or more other processors on UE 100.

In some embodiments, CVM 155 may implement various computer vision and/or image processing methods such as 3D reconstruction, image compression and filtering. CVM 155 may also implement computer vision based tracking, model-based tracking, Simultaneous Localization And Mapping (SLAM), etc. In some embodiments, the methods implemented by CVM 155 may be based on color or grayscale image data captured by camera(s) 180, which may be used to generate estimates of 6-DOF pose measurements of the camera.

SLAM refers to a class of techniques where a map of an environment, such as a map of an environment being modeled by UE 100, is created while simultaneously tracking the pose of UE 100 relative to that map. SLAM techniques include Visual SLAM (VLSAM), where images captured by a camera, such as camera(s) 180 on UE 100, may be used to create a map of an environment while simultaneously tracking the camera's pose relative to that map. VSLAM may thus involve tracking the 6DOF pose of a camera while also determining the 3-D structure of the surrounding environment. For example, in some embodiment, VSLAM techniques may detect salient feature patches or keypoints or feature descriptors in one or more captured image frames and store the captured imaged frames as keyframes or reference frames. In keyframe based SLAM, the pose of the camera may then be determined, for example, by comparing a currently captured image frame with one or more previously captured and/or stored keyframes. Image feature descriptors may take the form of Scale Invariant Feature Transform (SIFT), Speeded-Up Robust Descriptors (SURF), etc., which are well-known in the art. The determined/stored image descriptors may be utilized at a later point by an image or object detector to determine the pose of a UE.

In some embodiments, CVM 155 may comprise 3D reconstruction module, which may use the camera pose and per-pixel map information to create a 3D model or representation of the environment. In some embodiments, 3D reconstruction module may be implemented using dedicated circuitry, such as Application Specific Integrated Circuits (ASICs), Digital Signal Processors (DSPs), and/or dedicated processor (such as processing unit(s) 150). 3D reconstruction module may use a set of 3D points in a point cloud, which may be determined from images of a structure, to obtain a 3D model of the structure.

In one embodiment, processing unit(s) 150 may track the position of camera(s) 180 by using monocular VSLAM techniques to build a coarse map of the environment around UE 100 for accurate and robust 6DOF tracking of camera(s) 180. The term monocular refers to the use of a single non stereoscopic camera to capture images or to images captured without depth information.

Tracking UE and/or camera pose, in a spatial coordinate system can be accomplished in a variety of ways. Where Satellite Positioning System (SPS) signals are unavailable or unreliable, such as in dense outdoor environments, such tracking can be done using a combination of visual and inertial tracking systems. For example, images captured by camera(s) 180 may be used in conjunction with measurements by IMU 170 and/or sensors in sensor bank 185 (e.g. altimeter, barometer, magnetometer etc.) and/or other wireless measurements (e.g. WWAN signal measurements) to determine the pose of UE 100 and/or camera(s) 180. In some embodiments, VSLAM based techniques may be used, in part, to correct for errors (such as biases and drift) in IMU 170. Where available, GPS coordinates may also be used to provide location information. In some embodiments, a hybrid Visual-Inertial Tracker may incorporate a SLAM/VSLAM system with an Extended Kalman Filter (EKF), providing various inputs to the EKF to track the pose of camera(s) 180 and/or UE 100. The Kalman Filter (KF) is a widely used method for tracking and pose estimation. Specifically, the KF operates recursively on a sequence of noisy input measurements over time to produce a statistically optimal estimate of the underlying system state, which may include estimates of unknown variables. The EKF linearizes non-linear models to facilitate application of the KF.

In some embodiments, the pose of the camera may be used to recalibrate sensors in IMU 170, and/or to compensate for and/or remove biases from measurements of sensors 185 and/or sensors in IMU 170. For example, IMU 170 and/or sensors 185 may output measured information in synchronization with the capture of each image frame by camera(s) 180 by UE 100. When the camera pose can be estimated accurately, for example, based on VLSAM (e.g. successful detection of one or more corresponding feature points in images) then the VSLAM estimated camera pose may be used to apply corrections to measurements by IMU 170 and/or sensors 185 and/or to recalibrate IMU 170/sensors 185, so that measurements by IMU 170/sensors 185 may more closely track the VSLAM determined pose.

In another embodiment, depth data from a depth sensor, which may be captured in conjunction with the capture of a depth-image by camera(s) 180, may be used to generate and incrementally update a 3D or volumetric model of the environment in real-time (or offline). For example, the current camera pose may be obtained by tracking a live depth-image frame relative to the 3D model based on the observed available depth data. As one example, each depth-image in a sequence of captured depth-images may be used with real-time SLAM to produce and/or incrementally update a 3D model while simultaneously tracking the pose of camera(s) 180 based on the depth data in each frame. With depth sensors and SLAM techniques users may be able to generate a smooth incrementally updating 3D reconstruction. In some embodiments, to save power, the depth sensors may be enabled to acquire depth information, when the SLAM based 3D reconstruction techniques determine that information that is new to an existing 3D model has been imaged.

Further, in instances, where 3D reconstruction capability is unavailable UE 100, the captured image data along with camera pose and other sensor data captured or measured in conjunction with the capture of image frames or the determination of camera pose may be stored in memory 130, medium 160 and/or sent to a server using transmitter 114, where the data may be processed offline to obtain a 3D model and/or map of the environment. Accordingly, one or more methods disclosed herein may also be performed offline by a server in communication with UE 100.

In some instances, the 3D model may take the form of a textured 3D mesh, a volumetric data set, a CAD model, a wireframe model, etc., which may be used to render the 3D environment being modeled. For example, in embodiments where a 3D mesh is used, keyframes in a VSLAM technique may be used to acquire a point cloud representation of an environment. The term point cloud refers to a set of data points in a coordinate system, such as, for example a 3D coordinate system with X, Y, and Z coordinates. The point cloud representation may then be converted into a 3D mesh using an appropriate scattered data interpolation method. In some instances, a sparse point cloud representation, which is based on a set of scattered data points, may be obtained and used during 3D reconstruction.

Further, in some embodiments, processing unit(s) 150 may further comprise a Positioning Engine (PE) or Position Determination Module (PDM) 156 (hereinafter PDM 156), which may use information derived from images, sensor and wireless measurements by UE 100 either independently, or in conjunction with received location assistance data to determine a position and a position uncertainty estimate for UE 100. For example, LADM 158 may process location assistance information comprising multipath and visibility map assistance information, PRS timing pattern and/or muting information, etc., which may then be used by processing unit(s) 150 to select a signal acquisition/measurement strategy and/or determine an initial location. In some embodiments, processing unit(s) 150 may also be capable of processing various other received such as Long Term Evolution (LTE) Positioning Protocol (LPP) or LPP extensions (LPPe) messages including assistance information either directly or in conjunction with one or more other functional blocks shown in FIG. 1A.

In some embodiments, UE 100 may include one or more UE antennas (not shown) which may be internal or external. UE antennas may be used to transmit and/or receive signals processed by transceiver 110 and/or SPS receiver 140. In some embodiments, UE antennas may be coupled to transceiver 110 and SPS receiver 140. In some embodiments, measurements of signals received (transmitted) by UE 100 may be performed at the point of connection of the UE antennas and transceiver 110. For example, the measurement point of reference for received (transmitted) RF signal measurements may be an input (output) terminal of the receiver 114 (transmitter 112) and an output (input) terminal of the UE antennas. In an UE 100 with multiple UE antennas or antenna arrays, the antenna connector may be viewed as a virtual point representing the aggregate output (input) of multiple UE antennas. In some embodiments, UE 100 may measure received signals including signal strength and TOA measurements and the raw measurements may be processed by processing unit(s) 150.

The methodologies described herein may be implemented by various means depending upon the application. For example, these methodologies may be implemented using modules in hardware, firmware, software, or any combination thereof. For a hardware implementation, the processing unit(s) 150 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented using code, procedures, functions, and so on that perform the functions described herein. Any machine-readable medium tangibly embodying instructions may be used in implementing the methodologies described herein. For example, software codes may be stored in a non-transitory computer-readable medium 160 or memory 130 that is connected to and executed by processing unit(s) 150. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored. In some embodiments, memory 130 may hold program code that facilitates hybrid photo navigation and mapping, image processing, SLAM, tracking, modeling, 3D reconstruction, and other tasks performed by MM 152, NM 154, CVM 155 and/or PDM 156 on processor 150. For example, memory 160 may hold data, captured still images, depth information, video frames, program results, 3D models, keyframes, as well as data provided by IMU 170, various sensors 185.

If implemented in firmware and/or software, the functions may be stored as one or more instructions or program code on a computer-readable medium, such as medium 160 and/or memory 130. Examples include computer-readable media encoded with computer programs and data associated with or used by the program. For example, the computer-readable medium including program code stored thereon may include program code to support hybrid photo mapping and navigation in a manner consistent with disclosed embodiments. The code may further support Advanced Forward Link Trilateration (AFLT)/hybrid-AFLT/Reference Signal Time Difference (RSTD)/OTDOA measurement and positioning, in part, by using location assistance information. Computer-readable media 160 includes physical computer storage media. A storage medium may be any available medium that can be accessed by a computer. By way of example, and not limitation, such non-transitory computer-readable media can comprise RAM, ROM, EEPROM, CD-ROM, flash memory, or other optical disk storage, magnetic disk storage or other magnetic storage devices, or any other medium that can be used to store desired program code in the form of instructions and/or data and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium 160, instructions and/or data may be provided as signals on transmission media included in a communication apparatus. For example, a communication apparatus may include a transceiver 110, which may receive signals through receiver 112 indicative of instructions and data. The instructions and data may cause one or more processors to implement hybrid photo mapping and navigation and/or AFLT/hybrid-AFLT/RSTD/OTDOA measurement and positioning, and/or other functions outlined herein. That is, the communication apparatus includes transmission media with signals indicative of information to perform disclosed functions.

Memory 130 may represent any data storage mechanism. Memory 130 may include, for example, a primary memory and/or a secondary memory. Primary memory may include, for example, a random access memory, read only memory, etc. While illustrated in this example as being separate from processing unit(s) 150, it should be understood that all or part of a primary memory may be provided within or otherwise co-located/coupled with processing unit(s) 150. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer-readable medium 160. As such, in certain example implementations, the methods and/or apparatuses presented herein may take the form in whole or part of a computer-readable medium 160 that may include computer implementable instructions 1108 stored thereon, which if executed by at least one processing unit(s) 150 may be operatively enabled to perform all or portions of the example operations as described herein. Computer readable medium 160 may be a part of memory 130.

Further, UE 100 may include a screen or display 190 capable of rendering color images, including 3D images. In some embodiments, display 190 may be used to display live images captured by camera(s) 180, Graphical User Interfaces (GUIs), program output, etc. In some embodiments, display 190 may comprise and/or be housed with a touchscreen to permit users to input data via some combination of virtual keyboards, icons, menus, or other Graphical User Interfaces (GUIs), user gestures and/or input devices such as a stylus and other writing implements. In some embodiments, display 190 may be implemented using a Liquid Crystal Display (LCD) display or a Light Emitting Diode (LED) display, such as an Organic LED (OLED) display. In other embodiments, for example as shown in FIG. 1B, display 190 may be a wearable display or a heads-up display, which may be operationally coupled to camera 180, processing unit(s) 150, and/or other functional units in UE 100.

Figure 2:
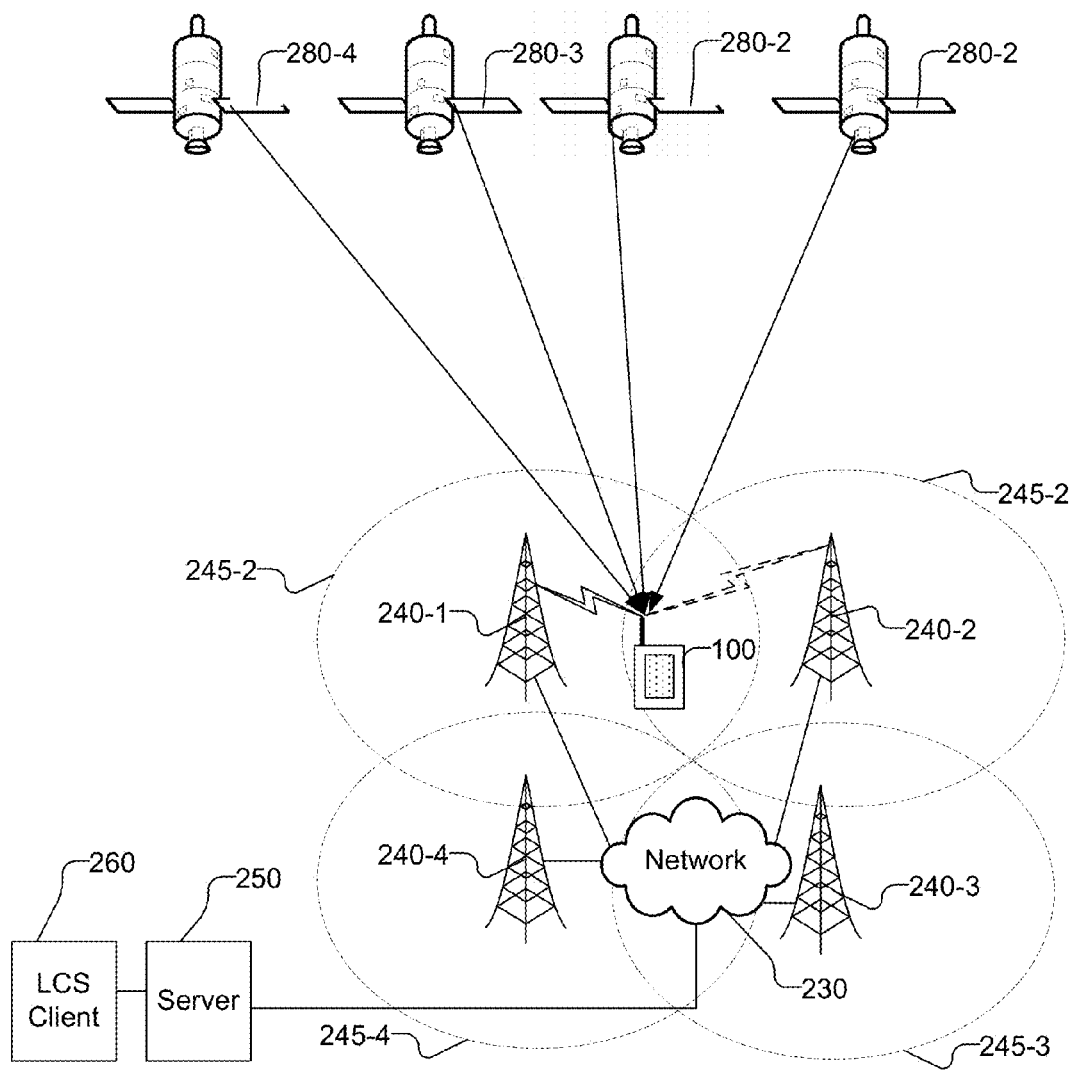
FIG. 2 shows an architecture of a system capable of providing Location, and/or Navigation services to UEs including the transfer of location assistance data or location information.

FIG. 2 shows an architecture of a system 200 capable of providing Location, and/or Navigation services to UEs including the transfer of location assistance data or location information. In some instances, system 200 may be used for mapping services, such as for use with hybrid photo mapping, in a manner consistent with embodiments disclosed herein.

For example, in some instances, server 250 may optionally send maps or other location assistance information to UE 100 (or a plurality of UDs 100), which may be used by UE 100 to estimate an approximate location. Further, one or more image frames, video, and/or other measurements, which may be captured by UE 100 may sent to server 150. For example, in some instances, based on the received location assistance data (e.g. by LADM 158) UE 100 may obtain measurements, including wireless signal measurements, and/or measurements using sensors 185, which may be captured in conjunction with the capture of images by camera(s) 180. The captured images and/or measurements may be used locally by UE 100 and/or may be sent to server 250. For example, the captured images and measurements may be used by UE 100 and/or server 150 to generate or update models/maps of a location and/or to update Base Station Almanac (BSA) data. The updated data/BSA data may then be sent to one or more UE 100 as location assistance data.

As illustrated in FIG. 2, the UE 100 may communicate with server 250 through network 230 and base station antennas 240-1-240-4, collectively referred to as antennas 240, which may be associated with network 230. Server 250 may, in some instances, provide the functionality of one or more of a mapping server, location server, BSA server, position determination entity (PDE), or another network entity. The transfer of the location and other information may occur at a rate appropriate to both UE 100 and server 250.

In some embodiments, system 100 may use messages such as LPP or LPPe messages between UE 100 and server 250. The LPP Protocol is well-known and described in various publicly available technical specifications from an organization known as the 3rd Generation Partnership Project (3GPP). LPPe has been defined by the Open Mobile Alliance (OMA) and may be used in combination with LPP such that each combined LPP/LPPe message would be an LPP message comprising an embedded LPPe message.

In some embodiments, UE 100 may receive and measure signals from base station antennas 240, which may be used for position determination. Antennas 240 may form part of a wireless communication network, which may be a wireless wide area network (WWAN), wireless local area network (WLAN), a wireless personal area network (WPAN), and so on. The term "network" and "system" are often used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax and so on.

A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM, W-CDMA, and LTE are described in documents from an organization known as the "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of personal area network. The techniques may also be implemented in conjunction with any combination of WWAN, WLAN and/or WPAN. For example, antennas 240 and network 230 may form part of, e.g., an evolved UMTS Terrestrial Radio Access Network (E-UTRAN) (LTE) network, a W-CDMA UTRAN network, a GSM/EDGE Radio Access Network (GERAN), a 1×RTT network, an Evolution-Data Optimized (EvDO) network, a WiMax network or a WLAN.

UE 100 may also receive signals from one or more Earth orbiting Space Vehicles (SVs) 280-1-280-4 collectively referred to as SVs 280, which may be part of a SPS/GNSS. SVs 280, for example, may be in a GNSS constellation such as the US Global Positioning System (GPS), the European Galileo system, the Russian Glonass system or the Chinese Compass system. In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

For simplicity, only one UE 100 and server 250 are shown in FIG. 2. In general, system 100 may comprise multiple cells indicated by 245-$k$ ($0 \leq k \leq N_{cells}$, where $N_{cells}$ is the number of cells) with additional networks 230, LCS clients 260, UDs 100, servers 250, (base station) antennas 240, and Space Vehicles (SVs) 280. System 100 may further comprise a mix of cells including macrocells and femtocells in a manner consistent with embodiments disclosed herein.

UE 100 may be capable of wirelessly communicating with server 250 through one or more networks 230 that support positioning and location services, which may include but are not limited to the Secure User Plane Location (SUPL) location solution defined by OMA and the Control Plane location solution defined by 3GPP for use with an LTE serving network. For example, Location services (LCS) may be performed on behalf of LCS Client 260 that accesses server 250 (which may provide functionality associated with a location server) and issues a request for the location of UE 100. Server 250 may then respond to LCS Client 260 with a location estimate for UE 100. LCS Client 260 may also be known as a SUPL Agent—e.g. when the location solution used by server 250 and UE 100 is SUPL. In some embodiments, UE 100 may also include an LCS Client or a SUPL agent (not shown in FIG. 1) that may issue a location request to some positioning capable function such as PDM 156 within UE 100 and later receive back a location estimate for UE 100. The LCS Client or SUPL Agent within UE 100 may perform location services for the user of UE 100—e.g. provide navigation directions or identify points of interest within the vicinity of UE 100.

Server 250 may take the form of a SUPL Location Platform (SLP), an evolved Serving Mobile Location Center (eSMLC), a Serving Mobile Location Center (SMLC), a Gateway Mobile Location Center (GMLC), a Position Determining Entity (PDE), a Standalone SMLC (SAS), and/or the like.

As illustrated in FIG. 2, the UE 100 may communicate with server 250 through network 230 and antennas 240, which may be associated with network 230. UE 100 may receive and measure signals from antennas 240, which may be used for position determination. For example, UE 100 may receive and measure signals from one or more of antennas 240-1, 240-2, 240-3 and/or 240-4, which may be associated with cells 245-1, 245-2, 245-3 and 245-4, respectively, in order to facilitate position determination. As another example, UE 100 may use a hybrid position location scheme, using a Global Positioning System (GPS) receiver on UE 100 and computing its position based on measurements from sensors 185 and/or captured images, in combination with AFLT and GPS measurements (e.g. from SVs 280). In some embodiments, a combination of GNSS', terrestrial measurements (e.g. AFLT, cell sector measurements, WLAN measurements, OTDOA) and/or sensor measurements (e.g. measurements using IMU 170, sensors 185, cameras or image sensors (which may include depth sensors), etc.) may be used to obtain a position estimate.

In some embodiments, a position estimate obtained may be a coarse and/or initial position estimate and may be refined in a manner consistent with disclosed embodiments. In general, measurements made by UE 100 may be combined with network related measurements, such as those stored in a BSA, to enhance the availability and accuracy of the computed positions of UE 100 and/or antennas 240.

As another example, in OTDOA based positioning, which is used with WCDMA and LTE, UE 100 may measure time differences in received signals from a plurality of base station antennas 240. Because positions of the antennas 240 are known, the observed time differences may be used to calculate the location of UE 100. For example, the measured time difference of arrival of Positioning Reference Signals (PRS), which is termed the Reference Signal Time Difference (RSTD), may be used along with the absolute or relative transmission timing of each cell, and the known position(s) of antennas 240 for the reference and neighboring cells, to calculate the position of UE 100.

In AFLT based positioning, which is used with CDMA, UE 100 may measure phases of pilot signals, which are synchronized to an absolute time scale (e.g. GPS time), and transmitted from four base station antennas 240-1-240-4. The measured phase of a pilot signal from an antenna 240-$i$, $1 \leq i \leq 4$ may be used to calculate the distance between UE 100 and the respective antenna. The set of distance measurements may be used to calculate location of UE 100 provided the time offsets of antennas 240 are known.

UE 100 may obtain a measure of time synchronization of the forward link cell signal by comparing the time of arrival of a cell signal with the absolute time scale. UE 100 may record the known GPS position and GPS time at the time of this measurement and using the known position of the cell transmitter(s), such as antenna 240-1, a time of arrival bias for the cell signal may be determined.

Determination of the time bias for a cell signal is known as Forward Link Calibration (FLC). In some instances, UE 100 may send raw measurement information to server 250, which may perform the forward link calibration. For example, the distance correction is quantified as a forward link calibration value (FLC). FLC improves positioning accuracy because even a synchronization variation of the order of a 100 ns between cells will translate into 30 meters of ranging error. Therefore, FLC accuracy facilitates optimal performance in terrestrial positioning systems. However, even within a cell 245, FLC may vary with position of UE based on a variety of factors such as signal attenuation, blockage, multi-path, etc.

For example, in dense urban environments, where blockage and/or multipath is more prevalent, mapping the environment to determine an exterior structural envelope and/or obtaining accurate position estimates may present challenges. For example, various signals, such as signals from SVs 280, and/or from one or more antennas 240 may be unavailable or weak thereby limiting position determination techniques that are based solely on wireless signals.

Accordingly, embodiments disclosed herein facilitate mapping and navigation in indoor environments using hybrid photo mapping and navigation techniques disclosed herein and thereby improving position estimation and extending terrestrial positioning system deployment and utilization.

FIGS. 3A and 3B show tables indicating the availability of different positioning techniques in a variety of situations along with associated location precision, positioning ambiguity, and power consumption. Position ambiguity refers to the possibility that a determined position using the technique is incorrect. For example, several feature points in two images taken at different locations may match, making it difficult to determine the actual location of the user device.

As shown FIG. 3A, SPS based positioning techniques are typically highly available outdoors globally, exhibit high outdoor precision, low outdoor position ambiguity, and fair power consumption. Further, a Line Of Sight (LOS) to the satellites facilitates time stitching with SPS systems. Time stitching refers to the capability to accurately correlate and align measurements obtained from various sensors to captured images on a common time scale.

Inertial navigation techniques are highly available both indoors and outdoors and exhibit fair power consumption but, because of drift and other biases, their precision is lower ranging typically from medium to good. IMU measurements are more easily time stitched and correlated with other measurements.

Photo navigation is highly available outdoors but exhibits higher power consumption and higher outdoor location ambiguity. For example, similar images may sometimes be obtained at various different locations making identification of a single location difficult without additional images and/or other sensory input. On the other hand, when UEs can be localized to an area, then location precision is high. For example, there may be a limited set of locations from where a known landmark or structural feature is visible, so based on a captured image, the location of the UE may be accurately determined for both mapping and navigation. Captured images may be time stitched and correlated with other measurements relatively quickly.

WAN based location techniques exhibit good availability both outdoors and indoors and, when available, have relatively strong signals. However, WAN signals have limited global availability because there may areas that are not served by cellular signals. WAN based location techniques exhibit relatively low power consumption, have medium outdoor precision, low outdoor location ambiguity and may be time stitched with fair ease.

Finally, LAN or beacon based location techniques exhibit fair availability outdoors but signal strength may vary significantly with location. LAN signals have good global availability, exhibit fair power consumption, have medium outdoor precision, low outdoor location ambiguity and may be time stitched with fair ease.

As can be seen from FIGS. 3A and 3B and the above description, the location techniques have various strengths and drawbacks when used individually. Thus, when using current location determination techniques, which rely on one of the above methods, mapping and/or navigation solutions are often sub-optimal.

Therefore, methods disclosed herein combine measurements from a plurality of sensors with images and wireless signal measurements to facilitate location determination. For example, SPS have global scope, while strong WAN signals may help with low power background navigation in a localized indoor environment, especially in situations where the locations of wireless access points are known. When combined with the excellent local precision provided by camera images and measurements from inertial sensors, which can provide additional input when wireless signals are unavailable, more robust and accurate positioning solutions may be enabled.

However, there is a dearth of maps, especially maps that show buildings and exterior features of structures in a manner that facilitates user orientation and navigation. Without such accurate and detailed maps, optimal utilization of position information is difficult. For example, while simple navigation instructions from point A to point B may be provided with a basic map, there may be considerable ambiguity that may lead to user frustration. Providing structural information or other visual cues for structures along the path from point A to point B may reduce ambiguity and user frustration. Therefore, obtaining reliable, accurate and detailed maps inexpensively for locations may facilitate more optimal use of existing user device functionality.

In some embodiments, showing local landmarks or exterior envelopes of structures that are registered to a map, may facilitate user orientation and use of the map. Therefore, disclosed techniques also combine measurements from a plurality of sensors with images and wireless signal measurements to facilitate mapping and/or navigation. For example, image based navigation techniques may be enhanced when used with precise "photo" and/or visibility maps. Similarly, precise calibration provided by images captured by a camera may be used provide effective outdoor wireless navigation. These and other techniques disclosed herein are used with user devices both to obtain and update maps of locations and to enable navigation functionality.

In some embodiments, Mapping Module (MM) 152 may be used to place UE 100 in a "mapping mode". In the mapping mode, camera(s) 180 on UE 100 may capture images or video at a specified frame rate in conjunction with measurements from sensors 185 (which may include various non-wireless/non-RF sensors such as magnetometers, altimeters, barometers and/or other magnetometer, altimeter, barometer and/or other) and IMU 170. For example, a user may place UE 100 in mapping mode when using UE 100 for mapping. In mapping mode, the camera may be placed in a "wide angle" mode. Further, in mapping mode, high resolution images may be captured, but the images may be compressed, filtered, or altered to reduce size. In some embodiments, the images captured by camera(s) 180 may be stored locally at high resolution and/or sent to server 250 for later processing. For example, in some embodiments, the images may be reduced to a vector map, or vector images, which provide variety of different content and resolutions to suit different needs.

Further, in some embodiments, when in mapping mode, CV module 155 may be configured to use "Manhattan World" assumptions. Manhattan World (MW) assumptions, which are used extensively to produce 3D reconstructions of urban structures from images and/or point clouds, assume that scenes or images captured by a camera consist of piece-wise planar surfaces with dominant directions. Typically, when MW assumptions are used to determine building geometry, a predominance of three mutually orthogonal directions in scene is assumed. Level and plumb surfaces and edges may also be assumed. MW assumptions facilitate 3D reconstruction from 2D images. Various well-known techniques are available for 3D reconstruction based on captured images. For example, in one exemplary embodiment, dominant plane directions (e.g. X, Y, Z) may be extracted from an image, hypotheses may be generated for planes in the image (e.g. based on feature point densities in the image) and a 3D reconstruction obtained by associating image pixels with one or more of the planes. When used with depth sensors, MW assumptions may facilitate faster 3D reconstruction based on the acquired depth information. When inertial sensors are used to determine device orientation and camera angle, MW assumptions may facilitate more efficient discernment of vertical and horizontal edges and surfaces and their respective locations, orientations and relationships.

In some embodiments, a mapping mode on a UE 100 may be activated opportunistically when the user is travelling through an area and/or is incentivized to travel through an area: (i) that has not been mapped and/or (ii) an area where updating map data is desirable. For example, when in mapping mode, based on crowdsourced data (or the absence of such data) pertaining to a location at a server the UE may request a "survey" of the interior and/or exterior of a structure. In another embodiment, opportunistic crowdsourcing may be used, and the user may be asked to enter mapping mode based on an estimated location of the UD. In some embodiments, the user's consent may be obtained and the user may actively participate in opportunistic crowdsourced mapping. In some embodiments, for example, where camera 180 is wearable, image capture and sensor data collection may be automatically triggered and the data may be stored on UE 100 and/or transmitted to server 250 based on previously obtained user consent. The term "crowdsourcing" is used to refer to the collection and subsequent aggregation of the collected image, RF, sensor and positioning related measurements from a plurality of UDs and/or PDEs. In some embodiments, upon detecting that a user is near a structure which may be desirable to map (or to update an existing map), the user may be asked or incentivized to perform the mapping in a manner consistent with disclosed embodiments. Because of the number of structures and the frequency of changes to the structures, traditional methods of maintaining updated maps which include exterior structural envelopes of the structures, even when possible, are cost prohibitive. The use of crowdsourcing in conjunction with mapping methods disclosed herein facilitates the maintenance and update of maps including 3D external envelopes of structures. Further, areas that are highly trafficked are more likely to have frequently updated and accurate maps. Thus, a map database based on crowdsourced map data including exterior 3D structural envelopes of buildings, obtained in a manner consistent with disclosed embodiments is more likely to be populated with data for areas with a higher demand for accurate and updated data.

Figure 4A:
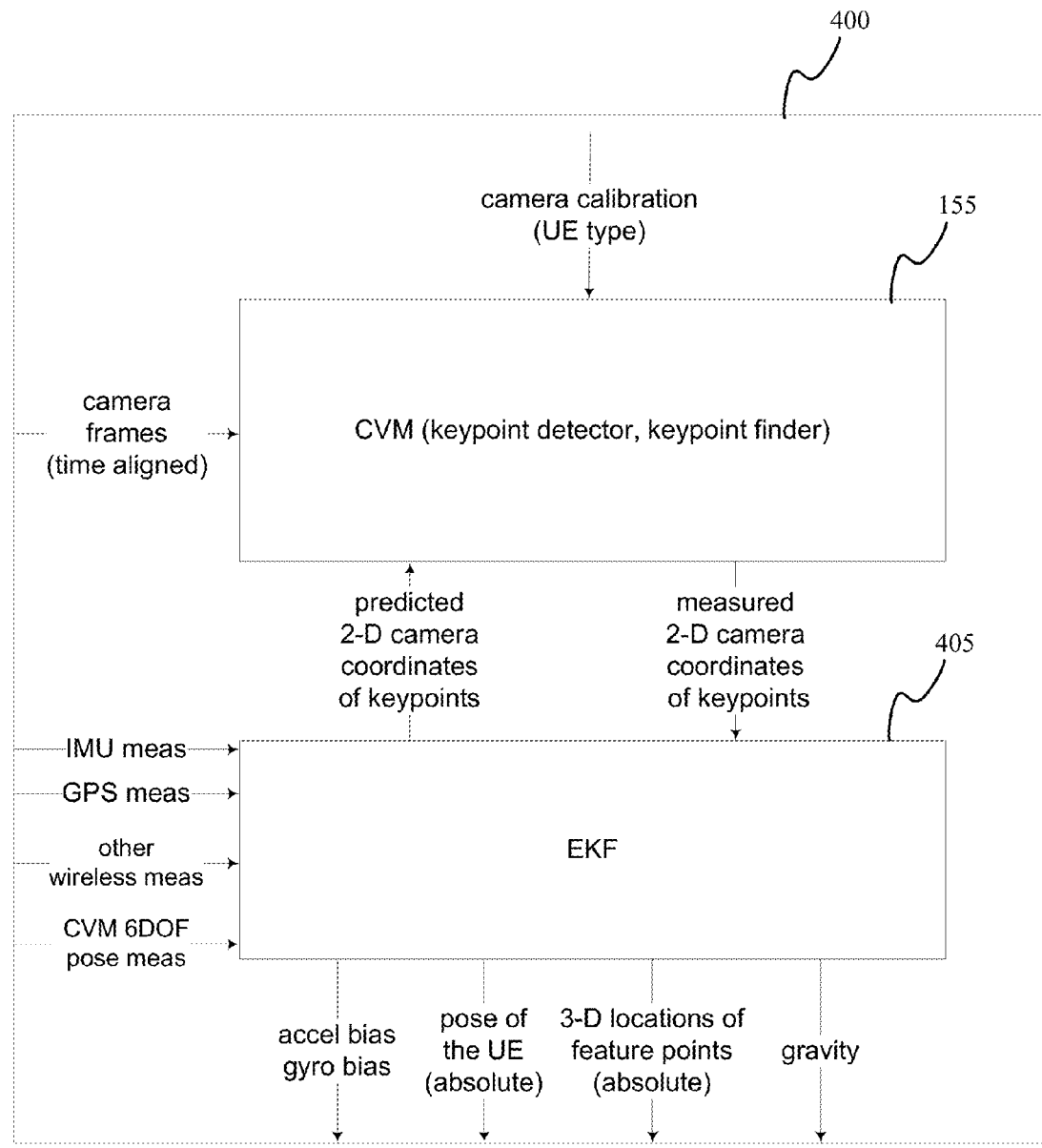
FIG. 4A is a block diagram of an exemplary application 400 capable of performing mapping in a manner consistent with disclosed embodiments.

FIG. 4A is a block diagram of an exemplary application 400 capable of performing mapping in a manner consistent with disclosed embodiments. In some embodiments, portions of application 400 may run on UE 100 using processing unit(s) 150 and/or on a server wirelessly coupled to UE 100. In some embodiments, application 400 may use a SLAM-EKF topology utilizing CVM 155 and an EKF component 405. In some embodiments, functionality associated with application 400 may be implemented by hardware, or software or a combination thereof.

Figure 4B:
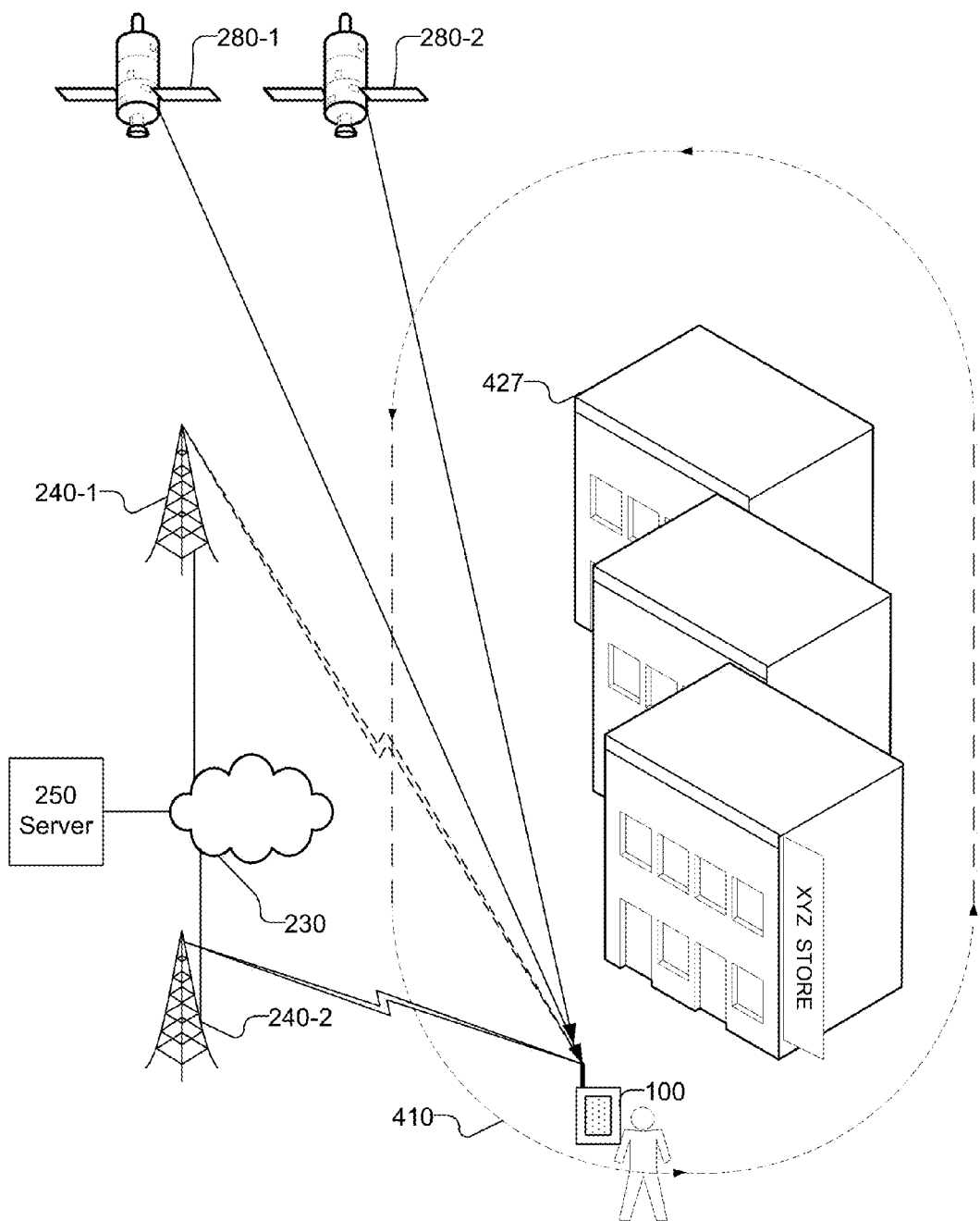
FIG. 4B shows the user in an environment where mapping application may be run and where signal reception from satellite vehicles (SVs) and/or wireless networks may be available.

Referring to FIG. 4B, which shows the user in an environment where mapping application 400 may be run and where signal reception from satellite vehicles (SVs) 280 and/or wireless networks may be available. Accordingly, in FIG. 4B, UE 100 may be place in a mapping mode and images may be collected by UE 100 as the user travels around an outdoor location—such as a building 427—as directed by the application.

For example, the user may be directed to follow trajectory 410 and images may be collected by UE 100 as the user travels around structure 427. In some embodiments, in conjunction with the capture of images, UE 100 may obtain a measurement sets comprising wireless and non-wireless measurements, where each measurement set is associated with at least one image. For example, UE 100 may determine its position and record measurements of signals from SVs 280 at various locations on trajectory 410. In addition, UE 100 may also record measurements of wireless signals from wireless network 230 and/or antennas 240-1 and 240-2 in conjunction with image capture. In addition, UE 100 may also record measurements from IMU 170 and/or one or more sensors 185, including magnetometer, altimeter, barometer etc. in conjunction with image capture. For example, in some embodiments, MM 152 may commence mapping at a location where SPS signals are available and may determine the location of UE 100 at various times by timestitching measurement sets based on timestamps associated with the measurements and/or by using VSLAM on the timestamped captured images.

In some embodiments, a mapping application and/or MM 152 may direct the user to capture images of salient visual features including externally visible signs (such as store sign "XYZ STORE"), windows, doors, overhangs, corner points, neighboring structures, etc. For example, the inference that a wall is both "exterior" and "interior" can be made if it has a window in it. That window, as viewed from the outside and inside, may be used to align the two different views of the same wall. Accordingly, MM 152 may direct a user to capture features that are likely to be visible from both inside and outside the structure.

Accordingly, as illustrated in FIG. 4B, CVM 155 may receive image frames of the exterior of structure 427 that are synchronized to the capture of wireless and non-wireless measurements. Depending on available functionality, the image frames may be captured as a series of still images and/or as part of video. Embodiments utilizing video capture can, for example, receive images at 30 frames per second. Other embodiments may utilize other frame rates. CVM 155 may use camera calibration. Intrinsic camera calibration may include principal point, focal length, and radial distortion. Extrinsic camera calibration parameters may include rotation and translation information relative to IMU 170. Rotation can be estimated or, in some instances, the IMU may be assumed to be aligned with the camera.

As outlined above, CVM 155 may employ any of a variety of algorithms to determine and detect keypoints in image frames to estimate a 6 Degrees Of Freedom (6DOF) camera/UE pose relative to a current image frame. Some subset of the captured image frames may be stored as keyframes. In some embodiments, CVM 155 may use the pose determined in a prior image frame as an initial pose, which may then be refined based on the locations of keypoints in the image frame. When the pose of UE 100 has changed by more than some threshold, the current image frame may be stored by CM 155 as a new keyframe. The locations of keypoints and other image correspondences relative to a prior image frame or a stored keyframe may also be used to estimate scene geometry. For example, CVM 155 may assign depth information to features of structure 427 and 3D model of structure 427 may be iteratively created. In some embodiments, MW assumptions may be used to simplify 3D external envelope determination for a structure.

In some embodiments, the keypoint detection can result in the identification of measured 2D camera coordinates of keypoints, which are relayed to EKF component 405. The EKF component 405 may further share predicted 2D camera coordinates of keypoints with the CVM 155 to narrow the keypoint search space. When one or more keypoints are located by CVM 155, the 2D camera coordinates of these keypoints may be provided to EKF component 405. In some embodiments, CVM 155 may also provide a 6 Degrees Of Freedom (6DOF) camera pose, which may be determined by CVM 155, based on the locations of keypoints in image frames.

In some embodiments, the input 6DOF camera pose (provided by CVM 155) may be refined by EKF 405 to obtain a pose of the UE in absolute coordinates based on inputs supplied by CVM 155 and/or IMU and/or wireless measurements. The 6DOF camera pose determined by the EKF may also be used to calculate/update a 3D location of one or more the target features. EKF component 405 may utilize the 2D keypoint measurements from CVM 155 along with wireless and/or non-wireless measurements to track the 6DOF pose of camera 180/UE 100 in absolute coordinates. For example, EKF component 405 may use a recent GPS or other wireless measurements (when available) to anchor measurement sets to an absolute coordinate framework.

The term "absolute coordinates" or "global coordinates" is used to refer to absolute SPS coordinates such as provided by GPS or any other global coordinate system such as the World Geodetic System (WGS) standards used for mapping and navigation. In some embodiments, EKF component 405 may provide a gravity vector in addition to the 3D locations of detected features points in image frames to CVM 155. In some embodiments, gravity and 3-D locations of keypoints may be obtained during or as part of the pose estimation process. For more information regarding determination of gravity, see "Visual-Inertial Navigation, Mapping And Localization: A Scalable Real-Time Causal Approach" (2010) by Eagle S. Jones, Stefano Soatto. In systems using conventional visual-inertial techniques a trajectory of a UE may be determined. However, conventional techniques do not disclose 3D structural envelope determination and the determination of outdoor maps based on the measurements, where the structural 3D envelope information and the outdoor maps are registered to absolute coordinates.

By determining UE/camera pose relative to the target and anchoring measurements to absolute coordinates, an absolute pose of the UE can be determined by EKF 405.

EKF component 405 may further determine any biases associated with IMU 170 and/or other sensors, which may be used to mitigate drift. Global optimization techniques such as Global Bundle Adjustment (GBA) may be used by the EKF 405 to correct for drift and in the computation of a closed loop trajectory of DE during mapping as outlined further below.

For example, in some embodiments, the mapping application may direct the user to return to features that were previously imaged. In some embodiments, the trajectory of the user may be corrected, to account for drift, by returning to visual features previously photographed. A "closed loop" trajectory may then be determined and used to correct for drift. The external 3D structural envelope of structure 427 registered to absolute coordinates may be determined based on the corrected and/or closed loop trajectory.

In some embodiments, the data gathered by UE 100, including the estimated trajectory and/or 3D structural envelope can be sent to a server to build an outdoor map, which may include 3D structural envelope information for structure 427 registered to absolute coordinates on the outdoor map.

When traversing path 410 collecting data for map creation, the determined locations (e.g. the pose of UE 100 output by EKF 405) may be subject to drift. For a 1% drift error, for example, a path length of 100 m will result in a drift of about 1 m. To correct for drift errors, loop closure detection (LCD) and global bundle adjustment (GBA) can be performed on the data gathered by UE 100/MM 152 and/or poses of the UE 100 output by EKF 405 after the user has completed gathering the data. In some embodiments, LCD and GBA may be performed on a server (e.g., a server creating the map). For example, DE 100 may send the collected data and/or an estimated trajectory to a server, which may perform LCD and GBA tasks. However, depending on the capabilities available on UE 100, one or more of LCD and GBA may be performed on UE 100.

For example, in some embodiments, the mapping application may direct the user to return to features that were previously imaged. In some embodiments, LCD may identify previously viewed features in images to determine drift. Using the data gathered by UE 100/MM 152, CVM 155 may use feature information from images captured by camera(s) 180 to determine areas with common feature information. For example, a first set of coordinates may be determined for a first static feature in a first image based on a camera pose and measurements associated with the first image. The first static feature may be identified in a subsequent image captured by the camera and associated with a second set of coordinates. Because the location associated with the feature has not changed, the LCD algorithm may determine a drift over the trajectory of UE 100. For example, the LCD algorithm may "close the loop" by assigning the first set of coordinates to any subsequent visit of the same feature. A GBA algorithm can then be used to correct and align the measurements to mitigate or eliminate drift error from an initially estimated trajectory (corresponding to path 410) and calculate an updated "closed-loop" trajectory (also corresponding to path 410). In some embodiments, the updated closed loop trajectory may be used along with an initially estimated external 3D structural envelope to obtain an updated external 3D structural envelope of structure 427, which may be registered to absolute coordinates on an outdoor map.

Figure 5A:
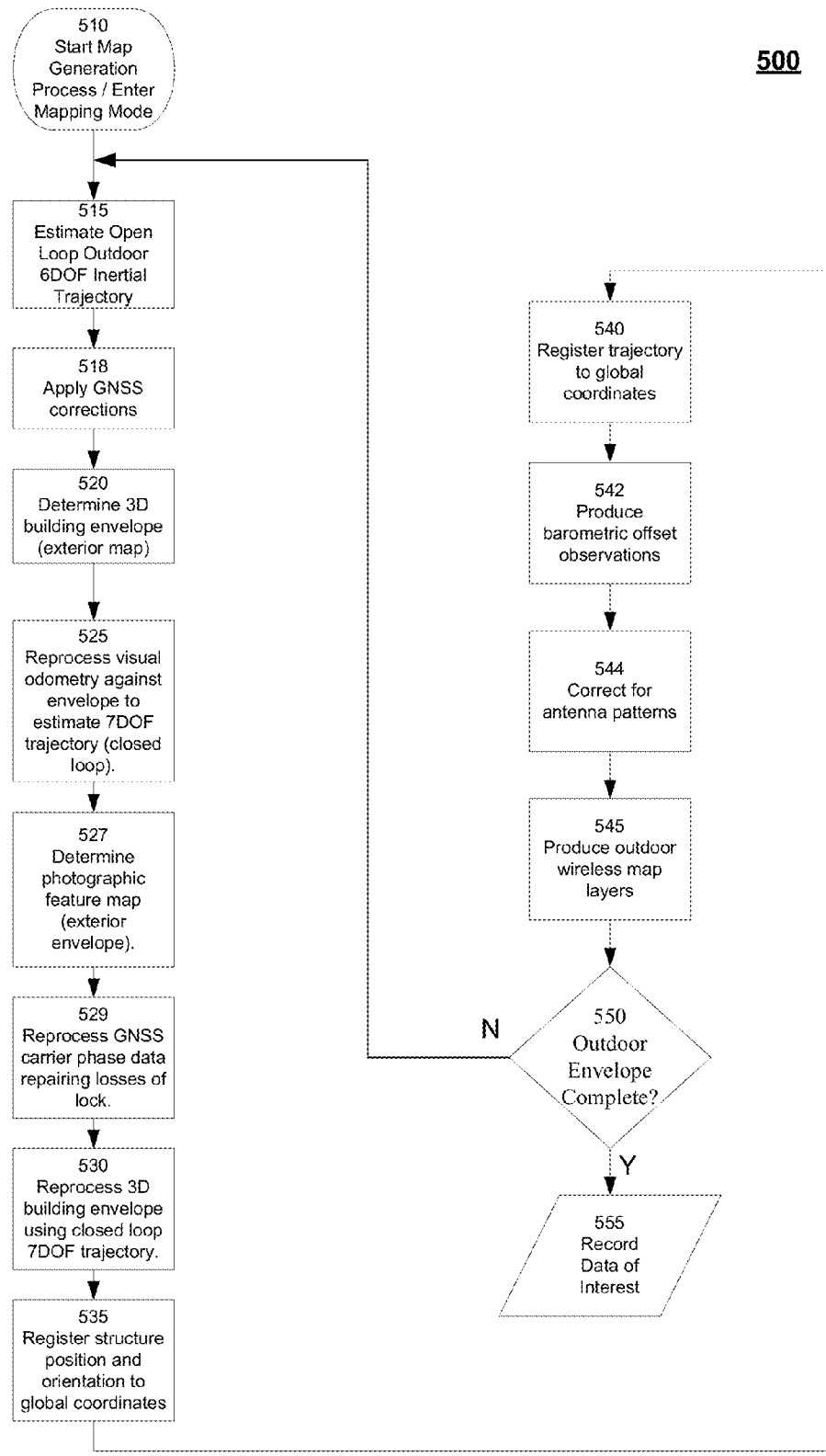
FIG. 5A shows a flowchart of an exemplary method for wireless map generation.

FIG. 5A shows a flowchart of an exemplary method 500 for wireless map generation. In some embodiments, method 500 may be performed by UE 100. In some embodiments, portions of method 500 may be performed by UE 100 and/or server 150.

In step 510, UE 100 may enter a mapping mode. In "mapping mode" UE 100 may collect continuous GNSS, camera and inertial data and other sensor data at a relatively high rate. Further, in mapping mode, sensory measurements such as RF measurements, GNSS measurements and data from inertial, magnetometer, altimeter, and/or barometric sensors may be captured in conjunction with the capture of images. In the mapping mode actual GNSS measurement data may be used such as continuous carrier phase observables (as opposed to the "position outputs" normally seen in smart phones) to provide a further anchor for the visual odometry process and to stabilize the UE clock state, so long as Line of Sight (LOS) conditions exist for at least one or more SPS satellites 280.

Typically data received from SVs 180 may have several sources of error. For example, errors may occur due to clock drift, ionospheric delay, multipath, a lower number of visible satellites, satellite geometry, satellite elevation relative to the horizon, etc. In some embodiments, SPS receiver may include a carrier phase receiver, which may measure carrier wave related information. The carrier wave, which typically has a much higher frequency than the pseudo random noise (PRN) sequence that it carries, facilitates more accurate position determination when used in conjunction with code phase measurements and differential techniques. The use of carrier phase measurements along with differential correction, can yield sub-meter position accuracy. In some embodiments, UE may use real-time carrier phase differential GPS (CDGPS) techniques to determine the position of UE at various point and times. UE positions may be used, in part, for example, to compute trajectory 410 (in FIG. 4), In step 515, a 6-DOF "open loop" trajectory of the UE 100 may be determined based on inertial measurements. For example, measurements by IMU 170 or sensors 185 on UE 100 may be used to determine the trajectory from an initial or starting position. Because of errors due to drift and other biases in the sensors, the trajectory, as measured by IMU 170 and/or sensors 185 will diverge from the actual trajectory followed by UE 100. Thus, the term "open loop" refers to the possibility that even if the UE's trajectory terminates at the starting location, a trajectory determined solely from measurements by IMU 170/sensors 185 may indicate that the trajectory end-point is different from the starting location.

In some embodiments, in step 518, measurements by IMU 170/sensors 185, wireless measurements (e.g. SPS/WLAN), captured images and other sensor measurements may be used to correct the inertial trajectory. For example, GNSS measurements may be used to correct the inertial trajectory. In some embodiments, the captured measurement data may be processed on UE 100 and/or sent to a server for processing. In some embodiments, floating integer carrier smoothed code measurements may be used, or carrier cycle ambiguities may be resolved. With strong GPS signal conditions, GPS carrier beat phase counting can be used to smooth code phase. Code multipath can change quickly when the MS is moving outdoors, which facilitates code phase smoothing. For example, multiple types of measurements for each satellite "channel" may be obtained from GNSS measurement engines including: code phase, Doppler and accumulated beat phase, also known as integrated carrier phase or accumulated delta-range. One or more of the measurements and/or techniques detailed above may be used for more accurate corrected absolute UE position determination at various points in time. The corrected absolute DE positions may be used to make trajectory corrections (such as to 7-DOF trajectory 410) followed by the UE 100.

Although, absolute errors may occasionally persist, distortions due to wireless multipath variation can be effectively mitigated using disclosed techniques, thereby providing a precise trajectory and therefore a precise map with multiple precisely associated map layers. For example, even in instances where the uncertainty in the absolute position of a structure error is in the order of a meter at mapping time, the associations in the various map layers may all be accurate to better than a meter. Therefore, in some embodiments, when the device is in LOS to GNSS signals, a precise trajectory may be determined. The precise trajectory determined may be used to cooperatively calibrate IMU sensors, and also determine the potentially larger biases and stability of other measurement sources and/or sensors 185, such as WWAN, WLAN, barometric sensors and magnetometers.

In step 520, a 3D building envelope or external 3D structural envelope and/or an exterior 3D map may be obtained based on the captured images, wireless (SPS and/or RF) signal measurements, measurements by IMU 170, and/or measurements by sensors 185. In some embodiments, the user may be directed to capture images of neighboring landmarks, structures, building overhangs etc while keeping a structure (such as structure 427) in view. The term "building envelope" refers to the outer shell of the building/structure that serves as a physical separator between the interior and the exterior environments of a building.

In step 525, a closed loop trajectory of UE 100 may be determined. For example, in instances, where LOS conditions exist to more than one satellite thereby permitting simultaneous multiple carrier phase observations the inertial trajectory may be stabilized. For example, the user/UE 100 may be directed to return to visual feature(s) that were previously photographed during the data collection. When a previously viewed location or feature is detected, the estimated trajectory can be re-estimated, which is termed as "loop-closing". Camera poses for the two images may be computed, for example, using VSLAM techniques based on the position of the visual feature in the two images. In some embodiments, an Extended Kalman Filter (EKF) or other techniques may be used to fuse camera and inertial (accelerometer/gyroscope) measurements to obtain a 6DOF camera pose for the captured images. Based on camera poses associated with the two images, IMU (gyro and accelerometer errors) 170 measurements may be modeled such that the trajectory is re-estimated to return to the photographed visual feature(s) with no apparent errors. This closed loop trajectory may be viewed as having 7 Degrees Of Freedom (7-DOF) indicating 3 dimensions of position uncertainty, 3 dimensions of rotational uncertainty, and an additional "dimension" of receiver clock bias.

The receiver clock bias relates wireless ranging measurements such as those associated with GNSS, WWAN and WLAN RTT. Receiver clock bias can be useful to improve accuracy because even timing errors on the order of 1 ns can translate into ranging errors on the order of 1 foot. In LOS conditions to GNSS satellites, corrected carrier phase measurements may have a precision on the order of 1 cm, but an unknown constant of integration. The constant of integration may be determined by a number of techniques known in the kinematic carrier phase processing art. In some embodiments, changes in carrier phase over the trajectory may be used to determine a precise UE position and a clock bias profile over the trajectory without knowledge of the constant of integration. In some embodiments, the changes in carrier phase over the trajectory may facilitate the creation of precise wireless delay maps, even in instances where the constant of integration is unknown or unavailable.

In many cases, absolute errors on the order of meters may remain, but distortions due to wireless multipath variation can be effectively mitigated, providing a precise trajectory and therefore a precise map with multiple precisely associated map layers, where the associations may all be accurate to better than a meter, even if the absolute position of the structure is not known to better than a meter at the time of mapping. While the device is in LOS to GNSS signals, then, it is possible to create a highly precise trajectory that can be used to not only cooperatively calibrate IMU sensors, but also determine the larger biases and stability of other measurement sources, such as WWAN, WLAN, barometric sensors and magnetometers.

In step 527, an exterior photographic feature map may be determined for the exterior envelope using visible features determined from the captured images. For example, a sparse 3D map of feature points for the exterior of a structure may be created. Feature detection and tracking may be performed, for example, using the well-known Lukas-Kanade method or variations thereof.

In step 529, GNSS carrier phase data may be used to repair losses of lock and corrections may then be applied to facilitate determination of absolute position. For example, if LOS conditions exist with respect to one or more of SVs, while Non-LOS (NLOS) conditions exist with respect to other SVs at various times, then, the carrier phase observations of the LOS satellites may be stitched together. In situations where there is a brief outage of the carrier phase observable (often referred to as a cycle slip) or NLOS conditions exist, data from a combination of inertial sensors, barometric sensors, magnetometers, and/or image based odometry may be used to "stitch" across the outages and determine UE position.

Figure 5B:
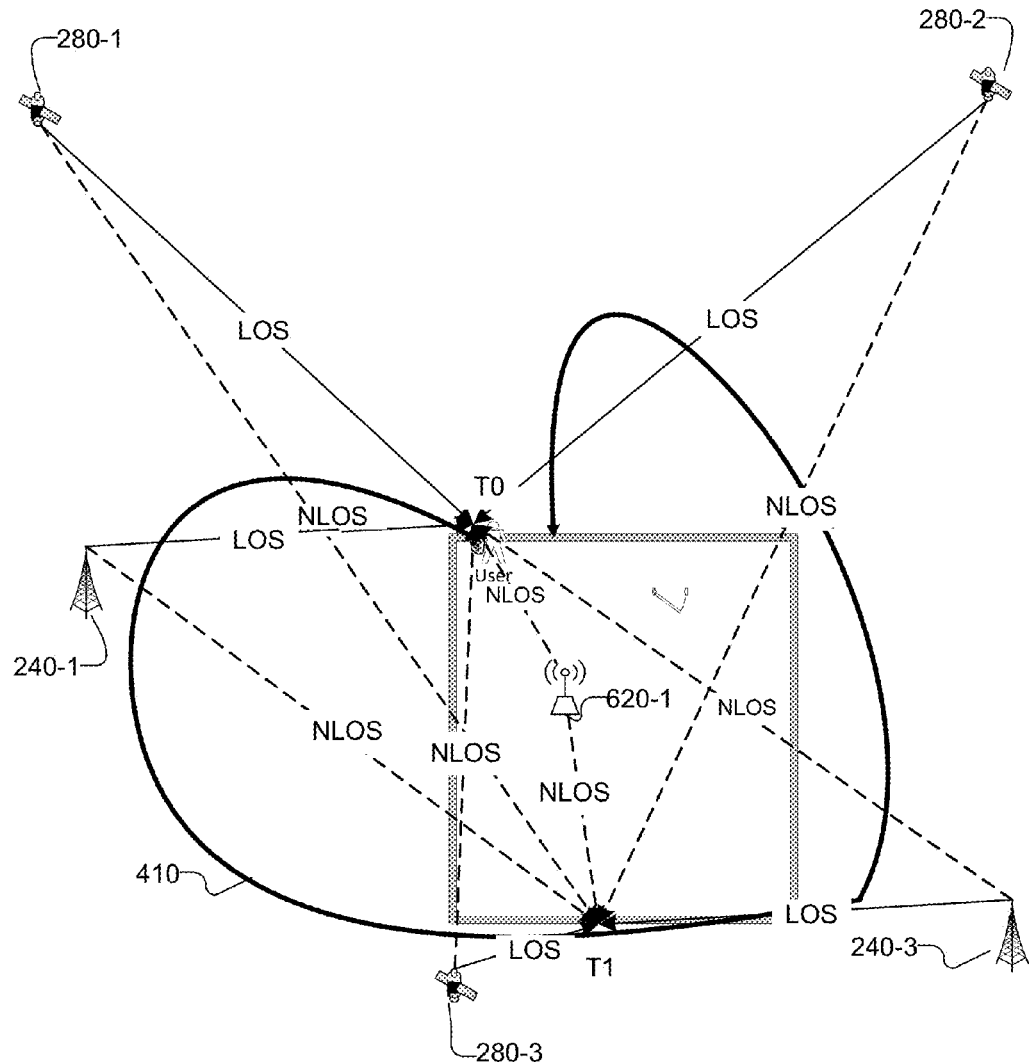
FIG. 5B shows Line of Sight and Non Line of Sight conditions that may occur at various locations and points in time as an UE follows a trajectory.

Non Line of Sight (NLOS) conditions may exist to one or more satellites at various points in time, but if LOS conditions exist to other satellites at those times, then, carrier phase observations of the LOS satellites may be stitched together. For example, as shown in FIG. 5B, at time T0, when following trajectory 410, UE 100 may receive LOS signals from SVs 280-1 and 280-2, antenna 240-1, while signals received from SV 280-3, antenna 240-3 and AP 620-1 may be NLOS. Further, at a subsequent time T1 and at a different location on trajectory 410, UE 100 may receive LOS signals from SV 280-3 and antenna 240-3, while signals from SVs 280-1 and 280-2, antenna 240-1 and AP 620-1 may be NLOS.

Thus, if LOS conditions exist with respect to one or more of SVs 280-1, 280-2, and/or 280-3 at various times, then, the carrier phase observations of the LOS satellites may be stitched together. In situations where there is a brief outage of the carrier phase observable (often referred to as a cycle slip) or Non LOS (NLOS) conditions exist, data from a combination of inertial sensors, barometric sensors, magnetometers, and/or image based odometry may be used to "stitch" across the outages and determine UE position.

For example, inertial stitching may be used when inertial trajectory drift is less than some threshold (e.g. less than half a GPS L1 wavelength). In some embodiments, if signals from SV's 280 and/or antennas 240 are unavailable for a period, then measurements from IMU 170 may be used to determine the trajectory from the position and point in time when the signals from SV 280 and/or antennas 240 were last available to the position and point in the time when the SV/antenna signals next become available. In some embodiments, the reprocessed carrier phase data and/or stitching may be applied to correct the 7-DOF or closed loop trajectory.

Referring to FIG. 5B, in step 530, in some embodiments, the 3D building envelope may then be re-determined based on the re-estimated 7-DOF trajectory. In some embodiments, MW assumptions may use to determine the building envelope. For example, it may be assumed that most walls are plumb (perfectly vertical) and meet at 90 degree angles. Thus, in this way, an initial, "open loop" 3D photo model of the building may be adjusted to rectangular walls and vertically aligned. The walls may also be assumed to be perpendicular or parallel. Then, the trajectory of UE 100 may be recalculated from the visual odometry data against this adjusted 3D photo model.

In step 535, the position of the building may then be registered to global coordinates, in part, by using GNSS pseudorange measurements. In some embodiments, the external envelope of the structure may be adjusted based on overhead images (e.g. satellite or other aerial images) in combination with local views of roof overhangs or other features. Overhead images of a structure at various resolutions may be obtained from various government and/or other publicly accessible databases.

In step 540, the re-estimated trajectory may then be registered to global coordinates. In some embodiments, the pseudorange measurement errors arising on account of multipath, satellite position, satellite clock drift, residual ionospheric and tropospheric signal delays, etc. may be mitigated using differential methods, where more accurate models for satellite position and clock, ionospheric activity and tropospheric wet delay etc may be used to mitigate errors. Furthermore, to the extent that carrier phase observations are concurrently available, multipath errors may be reduced using code-carrier smoothing and measurements with large code-carrier variance may be weighted appropriately.

In some embodiments, carrier phase differential GNSS processing may be used to further improve the device trajectory estimate with either floating or fixed (resolved) carrier cycle ambiguities. Carrier phase differential GNSS processing typically uses a nearby reference receiver at a known benchmark location that has been registered to a global coordinate system. In this case, residual atmospheric errors largely cancel out and cycle ambiguities may be resolved.

In an alternate embodiment, the device trajectory may be stitched together using visual odometry to form a synthetic carrier phase differential process over time. Because satellite-related errors and atmospheric errors change relatively slowly, the precision of the local map may be maintained initially without differential processing, and differential processing may be added subsequently for map registration and clarification when the appropriate reference data becomes available. The reference data may include observations of actual satellite position, orientation and clock offset.

In some embodiments, the satellite orientation may be determined while accounting for the phase pattern of the satellite antenna so that wide area satellite carrier phase corrections may be determined and applied. If the satellite orientation or any other factor creating signal phase variation is determined using a terrestrial reference receiver network, with or without the satellite antenna phase corrections, the resultant "differential corrections" may then be localized for use in the map processing.

In some embodiments, in step 542, barometric offset observations may be obtained. Barometric pressure typically follows a standard adiabatic lapse rate as height within the building changes. However, some buildings or portions of buildings may be pressurized. Any deviations from the standard adiabatic lapse rate may be inferred to be as a result of building pressurization. Those deviations, as well as any uncertainty in the deviations, may be noted as barometric annotations to the map. For example, "Barometric pressure observed to be X mm Hg higher than adiabatic lapse rate would predict from floor 24 to 36."

In step 544, wireless measurements may be corrected based on antenna patterns. For example, UE 100 may be placed in a calibration mode during or prior to entering mapping mode. When in calibration the determination of antenna patterns for an antenna on UE 100 may be initiated. In some situations, antenna pattern determination may be performed outdoors. Each antenna will have its own phase and gain pattern. When the orientation of UE 100 is known, the antenna pattern may be determined with a user holding the device in a typical pose and rotating it around one or more axes. The antenna pattern data obtained may be used to mitigate antenna pattern effects on subsequent RF signal characterization.

In step 545, measurements obtained in mapping mode from sensors may also be used to generate and/or update one or more existing maps, which may be stored on server 250. These maps may include one or more of an outdoor 2D road map or floor plan, a photo map, which may include 3D navigable feature database, a heat map, which may indicate signal strengths for one or more antennas at various locations, and/or a spatially variable FLC map, which may indicate signal delays for an antenna at various locations.

In some embodiments, one or more of the maps may be stored as and/or aggregated with measurements in existing map layers at differing levels of position granularity. The term "map layer" as used herein refers to information, such as measurement data, information derived from measurement data, location assistance information, etc. that is tailored to a position and position uncertainty of a UD. There may be different layers for each measurement type, all registered to the same local or absolute coordinates. For example, for each wireless signal of interest, there may be at least one of: FLC delay, signal strength, or attenuation map layers. There may be a barometric variation annotation layer. There may be a magnetic field variation layer, providing local corrections to a standard Earth magnetic field model.

In some embodiments, when in mapping mode, UE 100 may request and/or receive location assistance information to determine an initial location estimate, which may also be provided in the form of map layers. For example, location assistance information comprising a first FLC value may be provided in a first map layer to UE 100 based on an estimated first position and position uncertainty of UE 100. When the position/position uncertainty of UE 100 is refined or re-estimated based on the previously provided location assistance information, FLC values based on the refined position estimate/position uncertainty may be retrieved from another map layer to facilitate a more accurate determination of UE position.

In general, map layers may comprise various other types of information. For example, map layers may comprise one or more of: a received signal strength map layer that correlates a received signal strength with map locations; a Signal to Noise Ratio (SNR) map layer correlating SNRs with map locations; a Line of Sight (LOS) map layer indicating map locations where LOS conditions are likely with respect to one or more antennas; a Non-Line of Sight map layer, the NLOS map layer indicating map locations where NLOS or body blocked conditions are likely with respect to one or more antennas, etc.

In some embodiments, the map layers may also comprise at least one multipath layer to provide an indication of the extent of multipath for the antenna for locations in the BSA. Further, in one embodiment, the multipath layer may further comprise at least one of: a long shadow layer to indicate long shadow regions for the antenna, the long shadow layer comprising exclusion zones, an indication of the magnitude of multipath, and/or signal attenuation levels for the antenna in the long shadow regions; or a short shadow layer to indicate short shadow regions for the antenna, the short shadow layer comprising timing granularity information for antenna signals in the short shadow regions; or a transmitting pattern layer to indicate unique transmission patterns in at least one coverage area of the antenna. In some embodiments, UE 100 may use information in one or more map layers to estimate a location and location uncertainty, and based on the location and location uncertainty may request additional map layers. In some embodiments, a plurality of map layers may be provided to UE 100 based on the location/location uncertainty of UE 100. In general, location assistance information comprising map layers may be provided to UE 100 based on protocols used for communication with UE 100, available bandwidth for communication, signal conditions, cost, communication, memory and/or processing capability available at UE 100 and various other parameters.

Similarly, when measurements are received from UE 100, the measurements may be used to generate and/or update existing map layers. For example, the new measurements may replace one or more older measurements used to determine one or more map layers. For example, measurements older than some time period, and/or measurement deemed unreliable or inaccurate (e.g. with a position uncertainty estimate exceeding that in the current measurement) in one or more map layers may be updated. In some embodiments, the new measurements may be aggregated with the older measurements. For example, when statistically significant, an average, median and/or other statistical measure may be computed by aggregating the measurement with existing measurements to produce one or more updated map layers. In some embodiments, an appropriate version control mechanism may be used to maintain timeliness, precision and accuracy of the provided map layers.

In step 550, if the determination of the outdoor envelope of the structure is incomplete ("N" in step 550), then the process or portions of the process may be repeated and another iteration commenced in step 515.

If the determination of the outdoor envelope is complete ("Y" in step 550) then, the measured data of interest may be recorded on UE 100 and/or transmitted to a server. For example, the data may be recorded in database 135 associated with a mapping application. In some embodiments, the data may be stored in memory 130, removable media and/or computer readable medium 160 and/or other storage coupled to UE 100.

In some embodiments, all or part of the collected data may be processed on the UE 100 and/or sent to a server 250 for processing. In some embodiments, if maps are available for neighboring and/or attached structures, the indoor/outdoor maps for the current structure and the attached/neighboring structures may be stitched together, for example, by using exterior images. In some embodiments, pointers/associations to nearby structure maps may be cached in UE 100, and/or on the server. In some embodiments, where a "smart glass" or other wearable device is coupled to the phone such as a Bluetooth headset with a camera, the camera on the smart-glass/wearable device may be triggered when UE 100 is placed in mapping mode.

Figure 6:
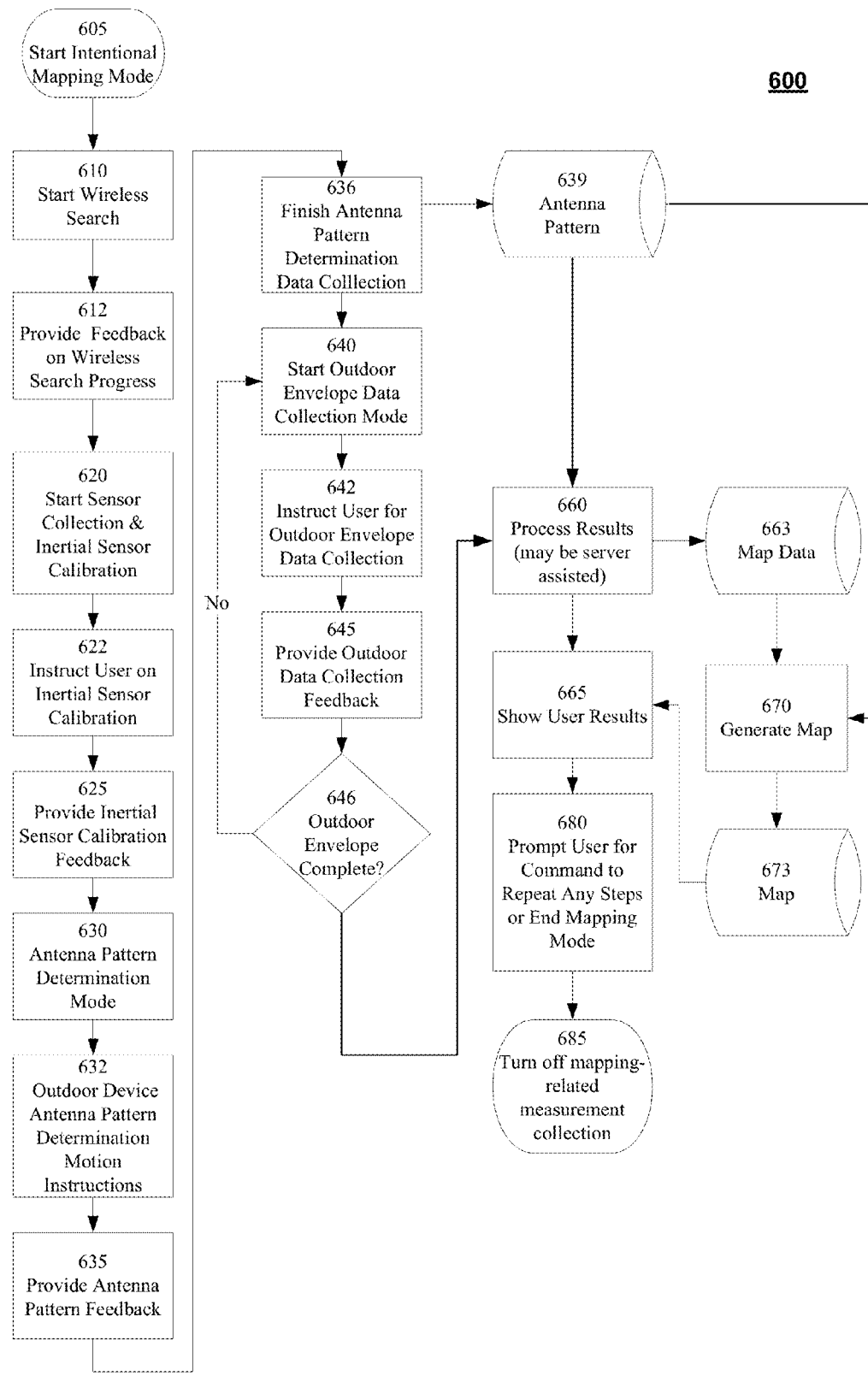
FIG. 6 shows a flowchart for an exemplary method of mapping data collection consistent with disclosed embodiments.

FIG. 6 shows a flowchart for an exemplary method of mapping data collection 600 consistent with disclosed embodiments. In some embodiments, method 600 may be performed by UE 100. In some embodiments, portions of method 600 may be performed by UE 600 and/or server 150. In some embodiments, portions of method 600 may be performed by UE 100 when in a mapping mode. For example, method 600 may be invoked in step 605 and UE 100 may enter or be placed in a mapping mode.

Next, in step 610, a search for wireless signals may be started. In some embodiments, location assistance data requested and/or received from server 150 may be used by UE 100 to select a strategy for wireless signal search. In some embodiments, the location assistance data may include WWAN, WLAN and/or GNSS assistance data. In step 612, feedback may be provided on the wireless signal search. For example, signals may be received from the serving cell and one or more neighboring WWAN cells 245, one or more GNSS SVs 280 and/or one or more WLAN APs 620 and their absolute and/or relative signal strengths noted.

In step 620, one or more sensors on UE 100 may be activated. For example, camera 180, sensors 185, and/or IMU 170 may be activated. In some embodiments, measurements of sensors 185 and/or IMU 170 may be synchronized to the capture of image frames by camera 180. In some embodiments, if wireless positioning (e.g. positioning based on GNSS and/or hybrid measurements) is available based on signals obtained in steps 610/612, then IMU 170 may be initialized with an initial position based on the wireless positioning.

In some embodiments, when UE 100 is placed in mapping mode, sensor measurements may be taken fine granularity in conjunction with and/or based on the video frame rate from 15 fps-30 fps. In some embodiments, one or more sensors may be calibrated using a camera pose determined using CV techniques based on the captured images. In some embodiments, one or more of an image timestamp obtained at an application level, a sensor timestamp obtained from an Application Programming Interface (API), an offset between the timestamps, and/or jitter in camera timestamps based on exposure times may be used for: (i) correlating various sensor measurements, (ii) correlating captured images with the sensor measurements, and/or (iii) time stitching the measurements. In some embodiments, when correlating sensor measurements with images relative timestamps or offsets may be used.

In some embodiments, in step 622, the user may be optionally instructed on calibration of IMU 170. In one embodiment, IMU 170 may be calibrated using images captured by camera 180. For example, the user may be instructed to point the camera at a target object and/perform a motion sequence. In step 625, the user may be provided feedback related to the motion sequence and/or the progress of calibration. For example Computer Vision (CV) based techniques, may be used to obtain a camera pose for a plurality of images. IMU 170 may be calibrated, in part, by comparing CV based poses for each of the plurality of frames with corresponding IMU determined poses for the frames. In some embodiments, IMU 170 may be calibrated using observation equations that relate CV measurements to IMU 170 error states, which may be modeled using well-known Kalman filter techniques.

In step 630, determination of antenna patterns for an antenna on UE 100 may be initiated. In some situations, antenna pattern determination may be performed outdoors. Each antenna will have its own phase and gain pattern. When the orientation of UE 100 is known, the antenna pattern may be determined with a user holding the device in a typical pose and rotating it around one or more axes.

Accordingly, in step 632, the user may be given instructions pertaining to the motion of UE 100 so that antenna pattern information for UE 100 may be determined. In some embodiments, to facilitate performance of the motion or movement of UE 100, feedback may be provided, in step 635, in terms of a direction to move the device, and/or the extent of completion of the antenna pattern determination process. In some embodiments, the feedback may be provided using Graphical User Interface (GUI) shown on display 190.

In step 637, UE 100 may provide an indication that the antenna pattern determination has completed and antenna pattern 639 for UE 100 may be generated. In some embodiments, antenna patterns determined in step 637 may be further corrected, for example, during step 540 in method 500 (FIG. 5A), based on the estimated orientation of the UE 100 over the course of a trajectory followed, such as, for example, trajectory 410. For increased accuracy and to further mitigate any residual GNSS carrier multipath, in portions of trajectory 410, where observation indicate that carrier multipath is most challenging along the inertial trajectory, with availability of a highly overdetermined trajectory solution, any residual phase errors may be mapped out and removed and/or deweighted. Accordingly, antenna pattern correction may occur even after the completion of step 637 and/or in conjunction with the performance of one or more steps (e.g. 515 through 540 in FIG. 5A) related to the determination of the outdoor trajectory in method 500. In some embodiments, antenna pattern data 639 may be used to mitigate antenna pattern effects on subsequent RF signal characterization.

In step 640, UE 100 may be placed in an outdoor envelope data collection mode; and, in step 642, the user may be instructed regarding outdoor data collection. For example, camera(s) 180 may be placed in a wide-angle mode and the user may be directed to capture images of doors, windows, and other features/structural elements that may also be visible indoors. As another example, the user may be directed to capture images of any roof overhangs, such that they may be subtracted from roof dimensions in the process of establishing a building perimeter from a combination of overhead imagery of the roof structure and photographs of the overhangs from the underside. It should be appreciated that overhangs may be the same on all sides of a building, but not always. Thus, models may assume a single observed overhang is the same around the entire perimeter and then correct this assumption later during the map determination process. Likewise, several estimates of the roof overhang may be made and averaged along a single exterior wall. Thus, it is important to keep track of not only the estimate of the overhang length and the roof pitch, but also how well these parameters are known, in the form of an uncertainty parameter.

In step 645, the user may be provided feedback regarding the trajectory to be followed. For example, the user of UE 100 may be asked to follow a continuous trajectory to obtain a view of the structure from all sides, while maintaining an optimal distance and/or view of the structure. In some embodiments, the user may be directed to capture images of nearby structures, landmarks etc while keeping the outdoor structure being mapped in view. The user may also be asked to point the camera such that entire edges, such as the full extent of a building corner, the full length of an eave or foundation wall, the full length of the edge between wall and ceiling, etc. may be seen at once. The user may be asked to circumnavigate the perimeter of a building or city block, for example, and return to their starting point to close the loop of the inertial navigation and confirm that the trajectory was precisely tracked for the entirety of the loop. The user may be asked to back-track if lock on too many satellites was lost or IMU calibration compromised for more than a brief period of time. In some embodiments, the user may be asked to reacquire the trajectory using visual means, assure lock has been regained and then continue on the route.

In step 647, if the image capture and measurement process for the outdoor envelope determination is incomplete, then, another iteration may be commenced in step 640. For example, the user may be asked to repeat trajectory 410 to maximize carrier phase continuity and/or to avoid specific difficult multipath locations while still maintaining a good visual view of the structure. In some embodiments, the satellite locations in the sky may be displayed to the user, with a representation of when lock is lost and/or regained, to provide the user with rapid feedback for how they are holding the device and maintaining lock.

In step 660, the measurements and images collected may be processed to obtain map data 663. In some embodiments, step 660 may be performed offline on a server such as server 250. For example, UE 100 may transmit the collected measurements and images to server 250. For example, sever 250 may be a Base Station Almanac (BSA) server and/or another location server, which may process and/or aggregate the measurements/images with data received from other UDs. In some embodiments, the sensor/RF/SPS/measurements may be correlated to the captured images to obtain map data 663.

In step 670, one or more maps 673 may be generated based on map data 663. In some embodiments, existing maps may be updated based on map data 663 to obtain maps 673. In some embodiments, maps 673 may be organized as layers at differing levels of UE position granularity. In step 665, results, such as the exterior envelope of the structure on a map may be optionally displayed to the user.

In step 680, the user may be prompted to end the mapping mode or repeat one or more steps in method 600. In some embodiments, a summary of map data 663 and/or the data collected may be shown to the user, when the user is prompted to end mapping mode. Based on the user input, mapping mode may terminate in step 685 and/or one more steps in method 600 may be repeated.

Figure 7:
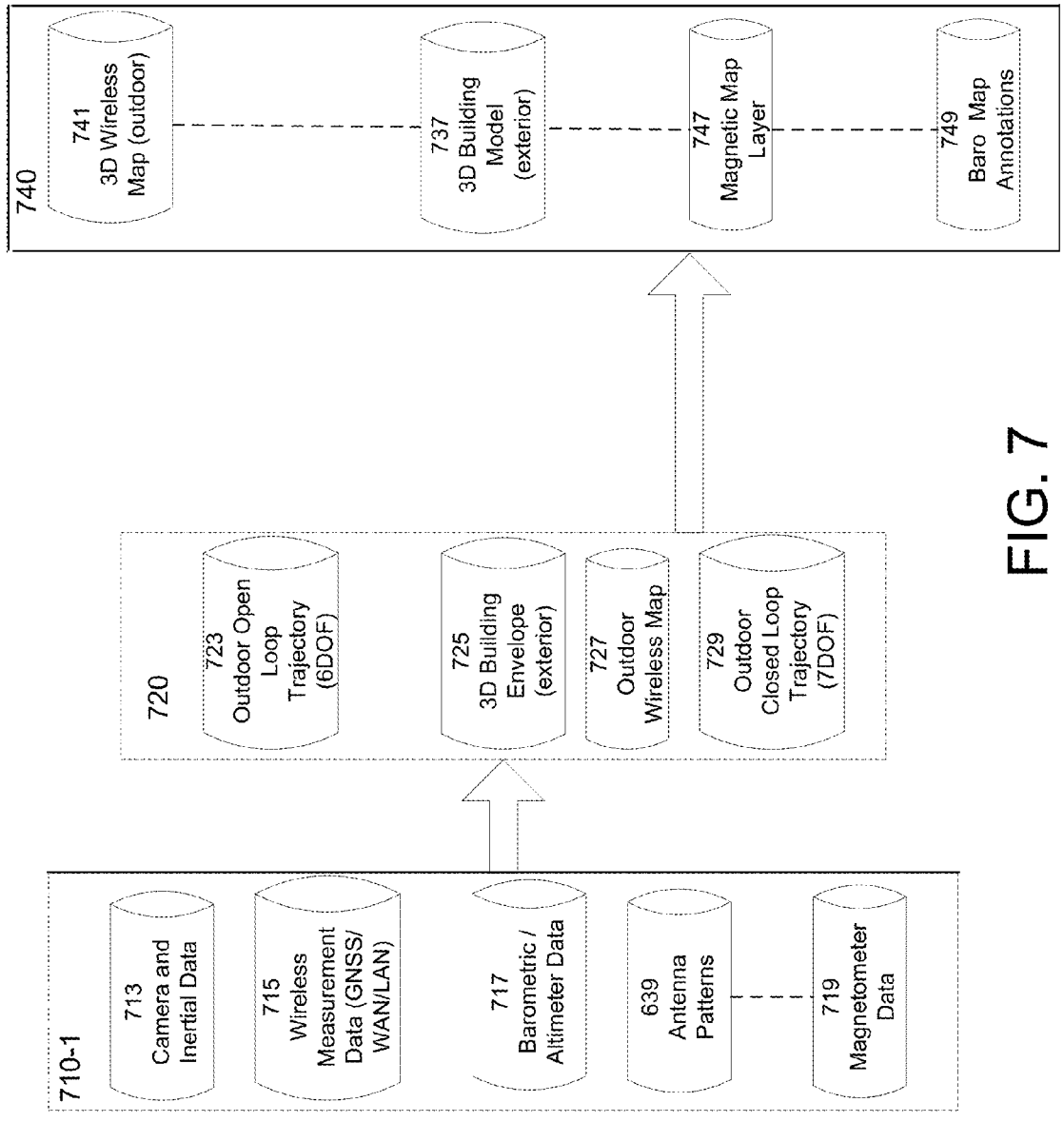
FIG. 7 shows an exemplary high level data flow during hybrid photo mapping.

FIG. 7 shows an exemplary high level data flow 700 during hybrid photo mapping. In some embodiments, during an outdoor data collection phase 710-1, one or more of Camera and Inertial Data 713, Wireless Measurement Data 715, which may include GNSS, WAN and LAN measurements, Barometric or Altimeter data 717, Antenna Pattern 639, and Magnetometer data 719 may be collected.

In outdoor data processing phase 720, data collected in outdoor data collection phase 710-1 may be used to obtain Outdoor Open Loop Trajectory 723, which may then be used to obtain an exterior 3D building envelope 725, Outdoor Wireless Map 727 and Outdoor Closed Loop Trajectory 729.

In a map generation phase 740, some or all of the data collected outdoors in data collection phases 710-1 and 710-2, respectively, may be used to update exterior 3D building model 737 and to generate various maps. For example, outdoor 3D wireless map, magnetic map layer, barometric annotations, etc. may be obtained.

Barometric pressure typically follows a standard adiabatic lapse rate as height within the building changes. However, some buildings or portions of buildings may be pressurized. Any deviations from the standard adiabatic lapse rate may be inferred to be as a result of building pressurization. Those deviations, as well as any uncertainty in the deviations, may be noted as barometric annotations 749 to the map. For example, "Barometric pressure observed to be X mm Hg higher than adiabatic lapse rate would predict from floor 24 to 36."

Figure 8A:
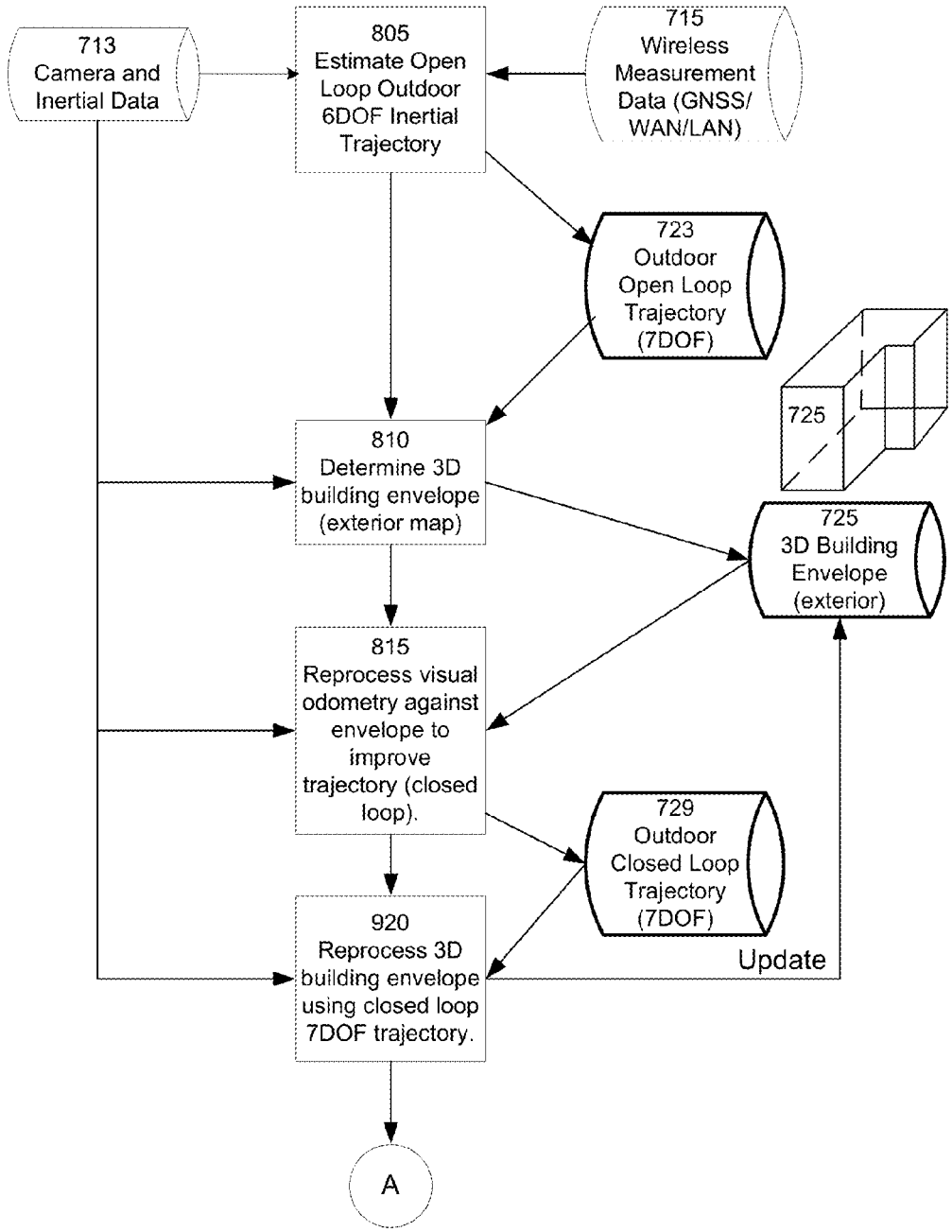
FIGS. 8A and 8B show a flowchart illustrating a method for map generation based on Photo, Wireless, Magnetic, and Barometric data.

FIG. 8A shows a flowchart illustrating a method 800 for map generation based on Photo, Wireless, Magnetic, and Barometric data. In some embodiments, portions of method 800 may be performed by UE 100 and/or server 250. In some embodiments, prior to invocation of method 800 or during an initialization step, UE 100 may enter a mapping mode. For example, in mapping mode UE 100 may collect continuous GNSS, camera and inertial data and other sensor data at a relatively high rate. Further, in mapping mode, sensory measurements such as RF measurements, GNSS measurements and data from inertial, magnetometer, altimeter, and/or barometric sensors may be captured in conjunction with the capture of images.

In step 805, outdoor 6-DOF open loop trajectory 723 of the UE may be determined based on the inertial data in camera and inertial data 713.

In step 810, in some embodiments, the exterior 3D building envelope 725 may be obtained based on outdoor 6-DOF open loop trajectory 723.

In step 815, outdoor 7-DOF closed loop trajectory 729 may be obtained by reprocessing visual odometry against exterior 3D building envelope 725. In some embodiments, a combination of SPS/GNSS/LAN/WAN measurements, IMU 170 measurements and images captured by camera(s) 180 may be used to determine the outdoor 7-DOF closed loop trajectory 729 of UE 100. For example, inertial stitching may be used when inertial trajectory drift is less than some threshold (e.g. less than half a GPS L1 wavelength). For example, where LOS conditions exist to more than one satellite thereby permitting simultaneous multiple carrier phase observations the inertial trajectory may be stabilized by returning to visual feature(s) that were previously photographed during the data collection and gyro and accelerometer errors may be modeled such that the trajectory (is re-estimated to return to the visual feature(s) with no apparent errors.

In some embodiments, MW assumptions may be used in determination of exterior 3D building envelope 725. Then, the trajectory of UE 100 may be recalculated from the visual odometry data against this adjusted 3D photo model to obtain outdoor 7-DOF closed loop trajectory 729.

Next, in step 820, the 3D building envelope 725 may be updated and/or reprocessed based on 7-DOF closed loop trajectory 729.

Figure 8B:
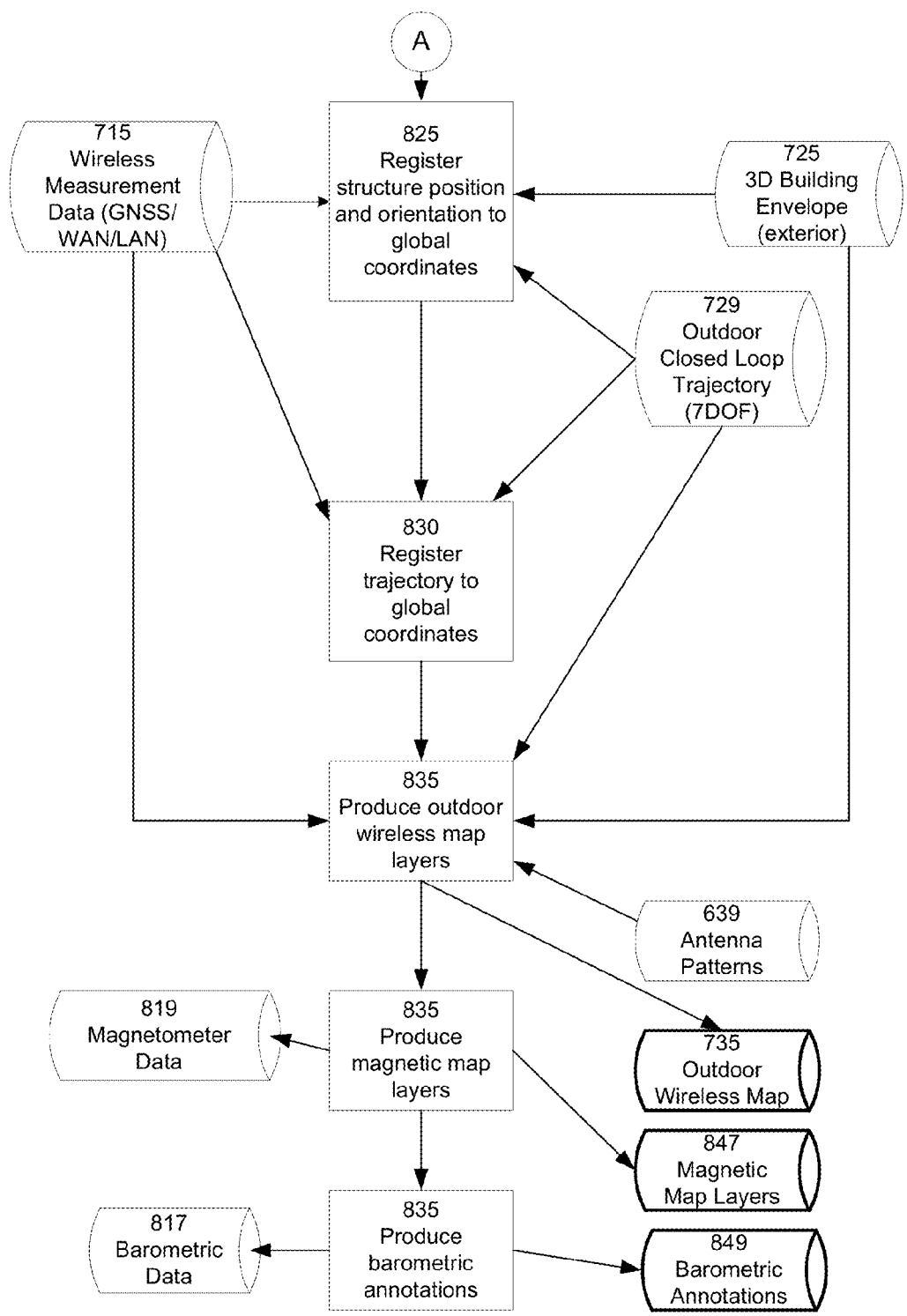

Referring to FIG. 8B, in some embodiments, in step 825, the position and orientation of the building may also be registered to global coordinates, in part, by using updated 3D building envelope 725 and wireless (e.g. GNSS) measurements 715. In step 830, outdoor 7-DOF closed loop trajectory 729 may then be registered to global coordinates.

In some embodiments, in step 830, antenna patterns 639, updated 3D building envelope 725 and wireless measurements 715 may also be used to generate and/or update one or more existing outdoor wireless map(s) 735. In some embodiments, outdoor wireless map(s) 735 may be generated and/or stored on server 250. These maps may include one or more of an outdoor 2D road map or floor plan, a photo map, which may include 3D navigable feature database, a heat map, which may indicate signal strengths for one or more antennas at various locations, and/or a spatially variable FLC map, which may indicate signal delays for an antenna at various locations. In some embodiments, one or more of the maps may be stored as layers at differing levels of position granularity.

In step 835, 3D outdoor wireless map 735 may be obtained based on outdoor closed loop trajectory 729, wireless measurement data 815, antenna patterns 739 and 3D model building model 837.

In step 840, magnetometer data 819 may be used to produce magnetic map layer 847, and in step 875, barometric data 817 may be used to produce barometric map annotations 849.

In some embodiments, all or part of the collected data may be processed on the UE 100 and/or sent to a server 250 for processing. In some embodiments, if maps are available for neighboring and/or attached structures, the indoor/outdoor maps for the current structure and the attached/neighboring structures may be stitched together, for example, by using exterior images. In some embodiments, pointers/associations to nearby structure maps may be cached in the UD, and/or on the server. In some embodiments, where a "smart glass" or other wearable device is coupled to the phone such as a Bluetooth headset with a camera, the camera on the smartglass/wearable device may be triggered.

Figure 9:
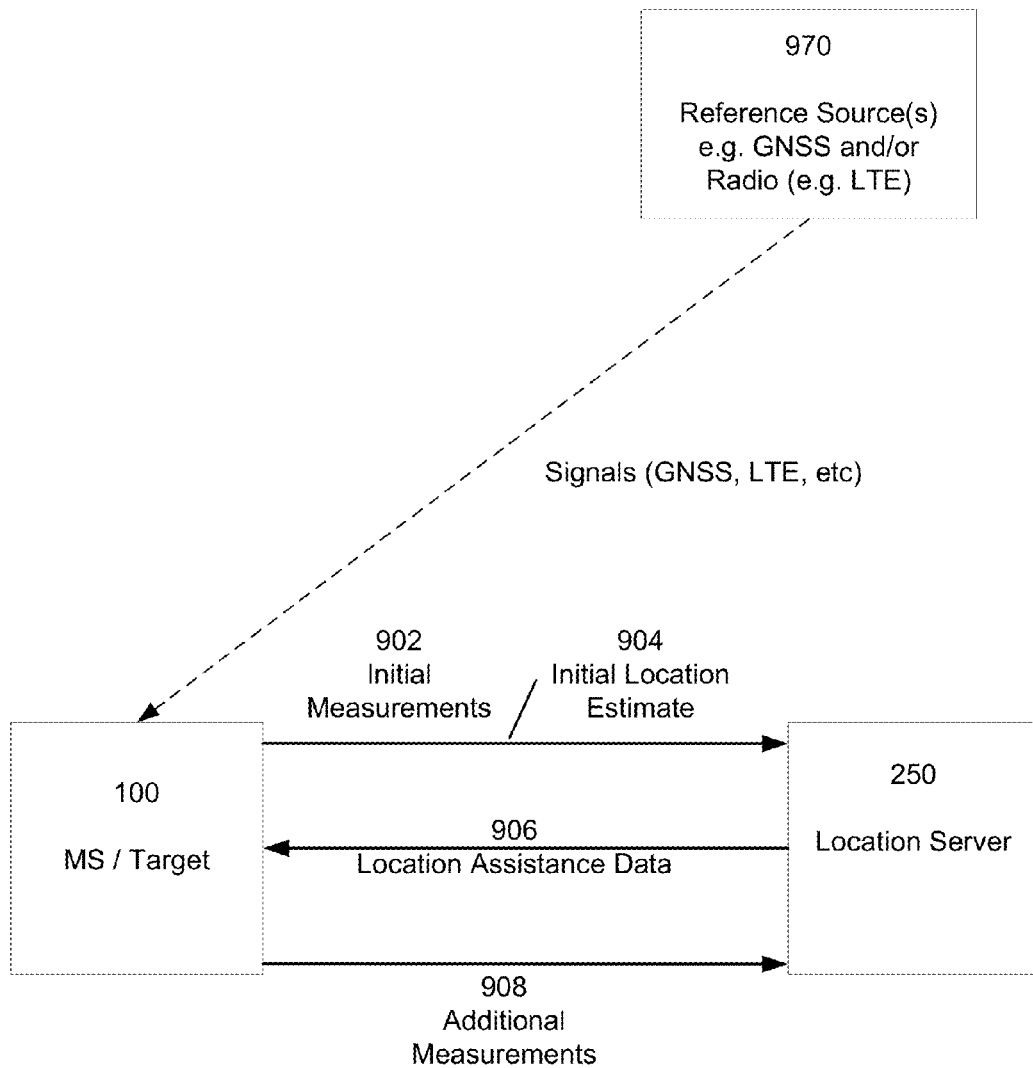
FIG. 9 shows a simplified block diagram illustrating some entities in a system capable of determining the location of a UE.

FIG. 9 shows a simplified block diagram illustrating some entities in a system 900 capable of determining the location of UE 100. In some embodiments, system 900 may form part of an UE assisted positioning system. Referring to FIG. 9, UE 100 may measure signals from reference source(s) 970 to obtain initial measurements 902 and/or initial location estimate 904. Reference source(s) 970 may represent signals from SVs 280 and/or antennas 240 and/or APs 620 associated with network 230. UE 100 may also obtain initial measurements 902 such as, for example, pseudo-range measurements for SVs 280 and/or OTDOA/RSTD related measurements from antennas 240.

In some instances, UE 100 may also obtain an initial location estimate 904 by using initial measurements 902. Initial location estimate 904, which is sometimes termed a "prefix", may be a coarse estimate of the position of UE 100. In some instances, range measurements by UE 100 may be used to obtain initial location estimate 904. In some instances, a location associated with the serving cell, or the strongest cell, or the earliest cell, or another cell may be used as initial location estimate 904. For example, the centroid of the serving cell, or the strongest cell, or the earliest cell, or some other cell may be used as initial location estimate 904. As a further example, a random or default starting location within a cell may be used as initial location estimate 904. Cell related information may be obtained from the Cell Sector Identity, Network ID, System ID, and other information transmitted by the base station. UE 100 may provide initial location estimate 904 and/or initial measurements 902 (e.g., satellite measurements from one or more GNSSs, or network measurements such as OTDOAs and/or RSTDs from one or more networks, etc.) to server 250. In some situations, UE 100 may not determine initial location estimate 904, instead, initial measurements 902 taken by UE 100 may be sent to server 250, which may use initial measurements 902 to determine initial location estimate 904 for UE 100.

Server 250 may provide then provide location related information based on initial location estimate 904, such as location assistance data 906 to UE 100. In some embodiments, the location assistance data may be received by one or more of LDAM 158, MM 152, PDM 156, and/or NM 154 and may be used to assist UE 100 in acquiring and measuring signals from SVs 280 and/or antennas 240, and/or in refining any initial location estimate 904 obtained from measurements 902. In some embodiments, the location assistance data may include map layers and/or other information at a granularity tailored to initial location estimate 904 and a position uncertainty associated with initial location estimate 904.

For example, UE 100, which in some instances may take the form of a Secure User Plane (SUPL) Enabled Terminal (SET), may communicate with server 250 and use location assistance data 906 obtain additional measurements 908. In some embodiments, additional measurements 908 may comprise various FLC related measurements and/or Pilot Phase measurements, Time of Arrival, RSTD/OTDOA measurements, measurements related to time offsets of base station antennas, GPS (e.g. pseudorange) measurements, etc. In some instances, in response to the receipt of location assistance data or lack thereof, UE 100 may enter mapping mode and capture additional measurements 908, which may include measurements from camera(s) 180, IMU 170, sensors 185 and other wireless (GNSS/WAN/LAN) signal measurements as outlined above. In some embodiments, UE 100 may send additional measurements 208 to server 250 or another PDE over network 230 and/or store the measurements in memory 130.

In some embodiments, server 250, UE 100, or another PDE may use additional measurements 208 to obtain a refined location for UE 100. In some embodiments, UE 100 may use additional measurements 1008 to directly obtain a refined location estimate. Further, in some embodiments, the refined location estimate for UE 100 may be communicated to LCS Client 260. When the position/position uncertainty of UE 100 is refined or re-estimated based on the previously provided location assistance information, FLC values and/or other information based on the refined position estimate/position uncertainty may be retrieved from another map layer to facilitate a more accurate determination of UE position. In general, position location may be UD-assisted, where UE 100 sends back raw or pre-processed measurement data through the base station to a PDE in the network for use in position determination; or, UD-based, where the position computation is performed by UE 100.

Wireless communication systems that provide position determination services, typically store and/or aggregate calibration information and other measurements used for location determination in one or more databases, such as a Base Station Almanac (BSA) database, a map database, etc. For example, the databases may include maps with map layers, which may include various other types of information.

For example, map layers may include one or more of: a received signal strength map layer that correlates a received signal strength with map locations; a Signal to Noise Ratio (SNR) map layer correlating SNRs with map locations; a Line of Sight (LOS) map layer indicating map locations where LOS conditions are likely with respect to one or more antennas; a Non-Line of Sight map layer, the NLOS map layer indicating map locations where NLOS or body blocked conditions are likely with respect to one or more antennas, etc. In some embodiments, the map layers may also include at least one multipath layer to provide an indication of the extent of multipath for the antenna for locations in the BSA. Further, in one embodiment, the multipath layer may further comprise at least one of: a long shadow layer to indicate long shadow regions for the antenna, the long shadow layer comprising exclusion zones, an indication of the magnitude of multipath, and/or signal attenuation levels for the antenna in the long shadow regions; or a short shadow layer to indicate short shadow regions for the antenna, the short shadow layer comprising timing granularity information for antenna signals in the short shadow regions; or a transmitting pattern layer to indicate unique transmission patterns in at least one coverage area of the antenna.

In some embodiments, UE 100 may use information in one or more map layers to estimate a location and location uncertainty, and based on the location and location uncertainty may request or retrieve additional map layers. In some embodiments, a plurality of map layers may be provided to UE 100 based on the location/location uncertainty of UE 100. In general, location assistance information comprising map layers may be provided to UE 100 based on protocols used for communication with UE 100, available bandwidth for communication, signal conditions, cost, communication, memory and/or processing capability available at UE 100 and various other parameters.

In some embodiments, each region on a map may be identified by the coordinates (e.g. latitude, longitude, altitude) of one or more boundary points, which may be dependent on the granularity of the map layer. Accordingly, in these embodiments, measurements pertaining to points within a region may be aggregated and associated with the region. Some or all of the hierarchy of aggregated measurements and related data may be provided to UE 100 based on its position/position uncertainty.

The BSA database may store/aggregate calibration and other base station related information. The BSA record for a base station may specify the base station identification information, the position (e.g. altitude, latitude and longitude) of the base station antenna(s), FLC values at a position for an antenna, antenna orientation, range, repeater information, etc. The term "FLC value" as used herein may refer to both FLC values and FLC residuals. FLC residuals may be specified in distance units (e.g. meters), while FLC values may be specified in time units (e.g. seconds). In some embodiments, the BSA may also include information such as the center of a base station sector coverage area, the maximum range of the base station signals, the average terrain height over one or more coverage area(s)/sub-area(s), the terrain height standard deviation over the one or more coverage area(s)/sub-area(s), round-trip delay (RTD) calibration information, pseudo-random noise (PN) increments in CDMA systems, uncertainty in the base station antenna position, uncertainty in the forward-link delay calibration, and uncertainty in the round-trip delay calibration.

In some embodiments, a system to facilitate terrestrial positioning system calibration may aggregate additional measurements 1008, including FLC related measurements and refined position estimates by a plurality of UDs/PDEs. In some embodiments, measurements in mapping mode by each of the plurality of UDs may be aggregated and stored on a server and statistical significance may be derived based on the aggregation. For example, a standard deviation, variance, mean, median and other statistical measures may be derived from the aggregation. In some embodiments, measurements taken by an UE 100 may be used to replace measurements in the database. For example, if visual images and/or other measurements indicate that the interior of a structure has changed relative to a stored 3D building model 837, then stored building model 837 may be updated and/or replaced with a new building model based on the more recent measurements. Similarly, one or more of exterior 3D building envelope 825, 3D wireless map 841, magnetic map layer 847 and/or barometric map annotations 849, and/or other map layers may be updated based on new measurements. Thus, UE 100 may both receive location assistance data 1006 in the form of information in the database(s) and additional measurements 1008 captured by UE 100 in mapping mode may be used to update the existing database(s).

For example, refined location estimate(s) associated with UE 100 and measurements (including images captured) by UE 100 at those location(s) may be associated and/or aggregated with measurements by other UEs for the same location and/or for a region in the vicinity of that location based on the granularity of the information stored in the database. In some embodiments, one or more of the captured images may be stored as keyframes or reference frames along with an estimated camera pose(s) associate with the keyframe image(s). In some embodiments, the exterior 3D envelope 725 may include keyframes.

In some embodiments, the refined position estimate may be associated with the aggregated measurements based on a quality threshold associated with the position fix. For example, a "Horizontal Estimated Position Error" (HEPE) quality measure, which represents an estimate of the error associated with each location fix, may be used to determine which measurements are added and/or aggregated to the BSA database. For example, measurements associated with position fixes with a HEPE value of less than some specified threshold depending on the desired accuracy or position granularity—may be added and/or aggregated with the database(s).

In some embodiments, a base station almanac database may be configured initially with default, average or estimated FLC values and with reasonably accurate antenna positions. In some embodiments, existing BSAs may be used and updated based on the plurality of additional measurements 208 received from the plurality of UE's 100 and/or PDEs. Based on repeated measurements made by the plurality of UE's 100/PDEs, the antenna position estimates and spatially-variable FLC values will continually improve over time leading to greater antenna position certainty, which may be used to improve the forward link calibration accuracy.

In some embodiments, server 250 may aggregate raw measurement information from a crowd of UDs to create statistically significant maps with information at different granularities associated with the measurements. In some embodiments, server 250 may perform some or all of the functions of a BSA, map, and/or location server. For example, server 250 may collect and format location data, generate and update maps or models, may provide assistance to UDs for position estimation, and/or may perform computations to obtain position estimates for the UEs. In some embodiments, server 250 may comprise a BSA server, which may manage a BSA database that stores a complete BSA.

Embodiments disclosed, for example, including the crowd sourcing of photographic and other measurements from a plurality of UDs/PDEs, may provide continuously maintained map data including indoor maps and reduce or remove the need for resource intensive field work. In some embodiments, a high sampling rate may be maintained throughout the network because of frequent crowd sourced sampling by a plurality of user owned devices. In some embodiments, the crowd sourced measurement may be used to build and/or update the database(s)/BSA.

Because the sampling rate, statistical significance, and accuracy of information are proportional to user density at a location, popular locations, which have higher user density, will be calibrated frequently. Accordingly, such crowd based calibration systems may optimize themselves to where users are located and/or where location services are repeatedly used. In contrast, existing systems are typically calibrated based on some metric of network geometry or signal propagation models, which may not reflect usage patterns. Further, popular locations that are frequented by UE users will also tend to have up to date, statistically significant, and accurate information. In addition, during the deployment of a system consistent with embodiments disclosed herein, FLC information for popular locations may be quickly obtained based on more frequent gathered measurements thereby facilitating deployment.

In some embodiments, photographic data and measurements may also be collected and/or supplemented by "wardriving". In wardriving, a user may capture images, take sensor measurements and take measurements of wireless signals, which may be correlated with UE position to obtain maps. The collected measurements may be aggregated with and/or used to supplement and/or replace measurements stored in databases and/or to update existing maps. In some embodiments, UE users, (e.g. users that are near a location or route where measurements/mapping is desired) may be incentivized to travel to the location and/or take a specified route. For example, a reward in the form of a cash reward, rebate, free airtime, or incentives targeted to establishments near the desired location or along the route may be used as incentives. In some embodiments, user consent may be obtained to install an application on a smartphone that may report measurements periodically to server 250.

In some embodiments, information in maps provided to UE 100 may include an indication of one or more of: the likelihood of detection of a signal, the likely accuracy of the signal at estimated position of UE 100 along with an estimate of the initial position uncertainty of UE 100. Further, in some embodiments, the maps provided to UE 100 may also include an indication of one or more of: the likelihood of LOS conditions, the lack of long multipath conditions, and/or a determination of whether UE 100 lies in a long or short shadow region. The maps may include simple annotations such as eNodeB antenna location, antenna pattern and output power, such that the UE may perform a simple link analysis with a first order model. Further, the map may contain differences between this first order model and a more localized model, containing higher order correction terms.

Figure 10:
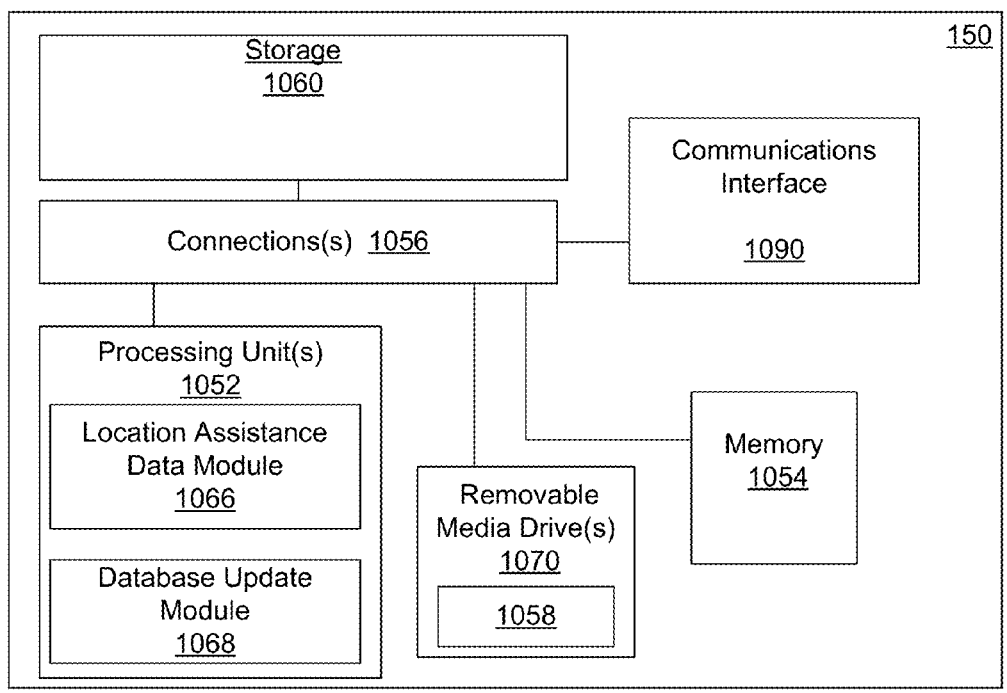
FIG. 10 shows a schematic block diagram illustrating a server enabled to support enabled to support hybrid photo mapping and navigation.

Reference is now made to FIG. 10, which is a schematic block diagram illustrating a server 250 enabled to support enabled to support hybrid photo mapping and navigation. In some embodiments, server 250 may also provide support for position determination and crowdsourced map generation and navigation. In some embodiments, server 250 may support location determination by providing location assistance information including layered maps in a manner consistent with disclosed embodiments. Further, in some embodiments server 250 may update databases (e.g. a BSA, map, and/or a configuration database) based on measurements and information reported by one or more UD' 100 in a manner consistent with disclosed embodiments. In some embodiments, server 250 may include, for example, one or more processing units 1052, memory 1054, storage 1060, and (as applicable) communications interface 1090 (e.g., wireline or wireless network interface), which may be operatively coupled with one or more connections 1056 (e.g., buses, lines, fibers, links, etc.). In certain example implementations, some portion of server 250 may take the form of a chipset, and/or the like.

Communications interface 1090 may include a variety of wired and wireless connections that support wired transmission and/or reception and, if desired, may additionally or alternatively support transmission and reception of one or more signals over one or more types of wireless communication networks. Communications interface 1090 may also include interfaces for communication with various other computers and peripherals. For example, in one embodiment, Communications interface 1090 may comprise network interface cards, input-output cards, chips and/or ASICs that implement one or more of the communication functions performed by server 250. In some embodiments, communications interface 1090 may also interface with network 230 to obtain a variety of network configuration related information, such as PCIs, configured PRS information, and/or timing information used by the base stations in the network. For example, Communications interface 1090 may make use of the LPP annex (LPPa) protocol defined in 3GPP TS 36.455 or a modification of this protocol to obtain PCI, configured PRS, timing and/or other information from the base stations in network 230. Processing unit 1052 may use some or all of the received information to generate location assistance data in a manner consistent with disclosed embodiments.

Processing unit 1052 may be implemented using a combination of hardware, firmware, and software. In some embodiments, processing unit 1052 may include Server Location Assistance Data Module 1066, which may generate location assistance information, including layered maps, with multipath and visibility information, spatially variable FLC data, PRS timing and muting assistance information, etc. for transmission to UDs 100. In some embodiments, Server Location Assistance Data Module 1066 may also generate location assistance information for transmission to UDs 100. Processing unit 1052 may also be capable of processing various other LPP/LPPe assistance information either directly or in conjunction with one or more other functional blocks shown in FIG. 10. In some embodiments, processing unit 1052 may generate the location assistance information as Long Term Evolution (LTE) Positioning Protocol (LPP) or LPP extensions (LPPe) messages.

Further, in some embodiments, processing unit(s) 1052 may further comprise a Position Determination Module (not shown), which may use information obtained from measurements by UE 100 to determine a position and a position uncertainty estimate for UE 100.

In some embodiments, processing unit(s) 1052 may also comprise Database Update Module 1068, which may correlate measurements by UE 100 with corresponding position estimates and position uncertainty estimates and update one or more BSAs and/or calibration databases. For example, for a measurement received from an UE 100, Database Update Module 1068 may aggregate the received measurement information with stored BSA data based on the position estimate and/or position uncertainty estimate associated with the measurement. The position estimate and position uncertainty estimate may be either determined by and received from UE 100, determined by server 250 (e.g. by a PDM on server 250), or by another network entity.

In some embodiments, processing unit 1052 may represent one or more circuits configurable to perform at least a portion of a data signal computing procedure or process related to the operation of server 250.

Figure 11:
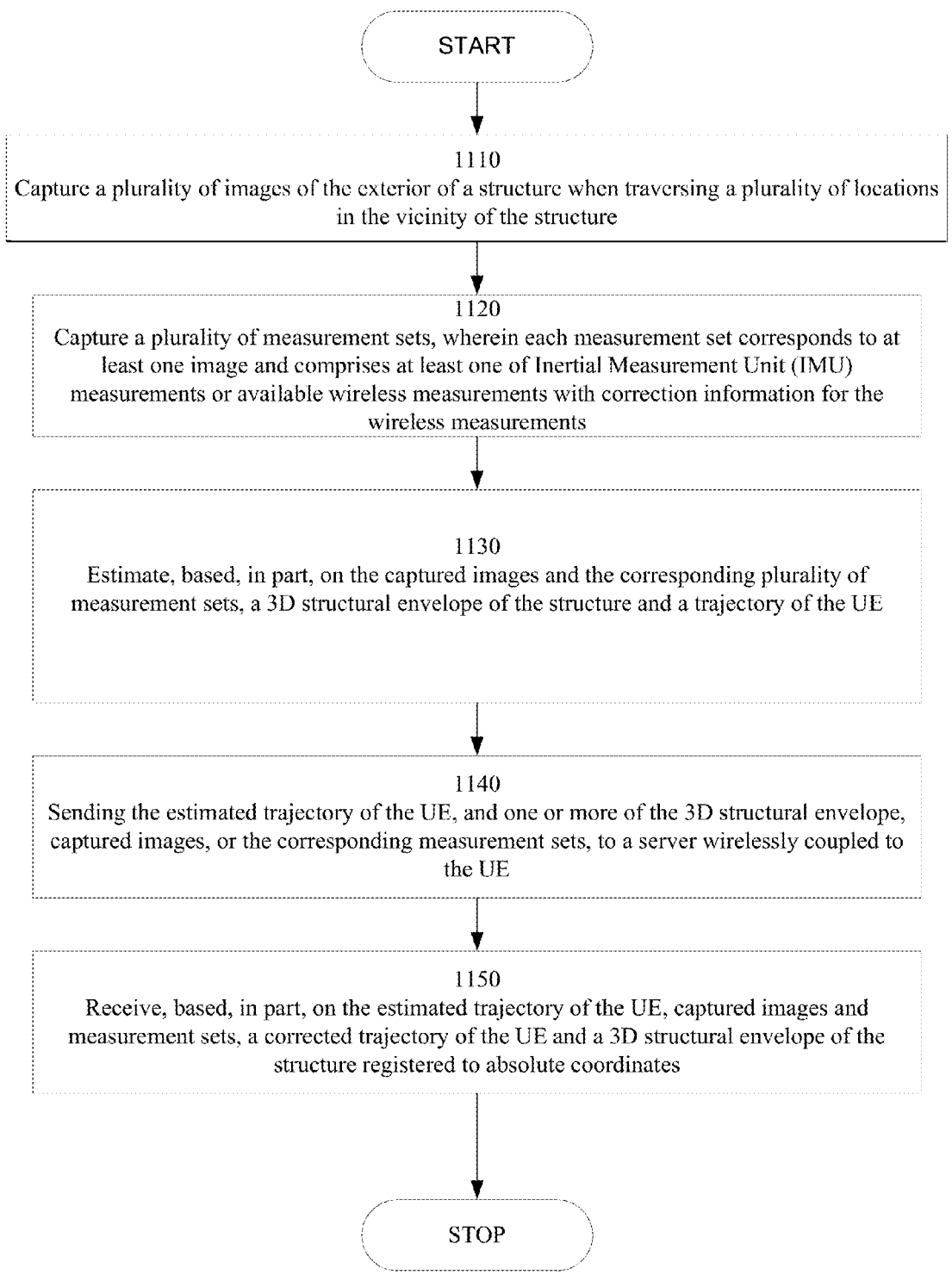
FIG. 11 shows a flowchart of an exemplary method of hybrid photo mapping consistent with disclosed embodiments.

FIG. 11 shows a flowchart 1100 of an exemplary method of hybrid photo mapping consistent with disclosed embodiments. In some embodiments, method 1100 may be performed by a UE 100; and/or a server wirelessly coupled to UE 100. In some embodiments, method 1100 may be performed by UE 100, server 250 or some combination thereof.

In some embodiments, in step 1110, a plurality of images of the exterior of a structure may be captured when traversing a plurality of locations in the vicinity of the structure.

In step 1120, a plurality of measurement sets may be captured within a short time window of the image capture, wherein each measurement set corresponds to at least one image and comprises at least one of Inertial Measurement Unit (IMU) measurements or available wireless measurements with correction information for the wireless measurements.

In some embodiments, the wireless measurements may comprise: Global Navigation Satellite System (GNSS) measurements comprising differentially corrected code and carrier phase observables and wherein the correction information for the wireless measurements comprises one or more of: GNSS code and carrier differential corrections, GNSS precise orbital and clock information, and GNSS atmospheric corrections.

Further, in some embodiments, the correction information for the wireless measurements is received by the UE from a network server. For example, the UE may send uncorrected wireless measurements to a network server and receive corrected wireless measurement information from the network server. In some embodiments, the correction information for the wireless measurements may comprise antenna pattern information for the UE.

The wireless measurements may further comprise Wireless Wide Area Network (WWAN) measurements comprising one or more of: Observed Time Difference of Arrival (OTDOA) measurements, or Reference Signal Time Difference (RSTD) measurements, or Advanced Forward Link Trilateralation (AFLT) measurements, or hybrid-AFLT measurements.

Next, in step 1130, a 3D structural envelope of the structure and/or a trajectory of the UE may be estimated based, in part, on the captured images and the corresponding plurality of measurement sets. In some embodiments, the trajectory of the UE may be estimated by: applying, for each location in a subset of locations on the trajectory, one or more of the: GNSS code and carrier differential corrections, GNSS precise orbital and clock information, or GNSS atmospheric corrections to GNSS measurements at the location; obtaining, for each location in the subset, a corresponding corrected location based on the corrected GNSS measurements; and determining a trajectory based, in part, on the corrected location corresponding to each location in the subset.

In some embodiments, the estimated trajectory of the UE and 3D structural envelope of the structure may be determined by applying Visual Simultaneous Localization and Mapping (VSLAM) techniques to a subset of the plurality of images of the structure to determine a scene geometry and a 6 Degrees Of Freedom (6DOF) pose of the UE relative to each image in the subset and a scene geometry, the pose being determined based on keypoints in the subset of images; and obtaining the external 3D structural envelope of the structure based, in part, on the scene geometry; and obtaining the estimated trajectory based, in part, on the estimated 6DOF pose. For example, the estimated trajectory may be obtained by providing the 6DOF pose to an Extended Kalman Filter (EKF), wherein the EKF determines a pose of the UE in absolute coordinates, based in part, on the 6DOF pose, IMU measurements and available wireless measurements.

In step 1140, the estimated trajectory of the UE, and one or more of the 3D structural envelope, captured images, and/or the corresponding measurement sets may be sent to a server wirelessly coupled to the UE.

In step 1150, a corrected trajectory of the UE and a 3D structural envelope of the structure registered to absolute coordinates may be received by the UE. The received corrected trajectory and/or structural envelope registered to absolute coordinates may be based, in part, on the estimated trajectory of the UE, and/or captured images and/or measurement sets, The corrected trajectory may correspond to a closed-loop trajectory of the UE. Further, in some embodiments, the corrected trajectory and 3D structural envelope of the structure registered to absolute coordinates may be received with an outdoor map comprising the corrected trajectory and the 3D structural envelope, wherein the outdoor map may comprise a plurality map layers registered to the absolute coordinates.

In some embodiments, the plurality of layers may include at least two of: a plan view map; or a 3D structural map, with external 3D structural envelope information for neighboring structures; attenuation or delay of WWAN signals associated with the structure, or annotations for any variation in WWAN signal strength in the vicinity of the structure; or a Line Of Sight (LOS) map layer, indicating, for each absolute coordinate in a first plurality of absolute coordinates on the map, corresponding WLAN antennas in a line of sight relative to the absolute coordinate.

The methodologies described herein in flow charts and message flows may be implemented by various means depending upon the application. For example, these methodologies may be implemented in hardware, firmware, software, or any combination thereof. For a hardware implementation, the processing unit 1152 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

Although the disclosure is illustrated in connection with specific embodiments for instructional purposes, the disclosure is not limited thereto. Various adaptations and modifications may be made without departing from the scope Therefore, the spirit and scope of the appended claims should not be limited to the foregoing description.

What is claimed is:

1. A method on a user equipment (UE), the method comprising:
    capturing a plurality of images of an exterior of a structure when traversing a plurality of locations in a vicinity of the structure;
    capturing a plurality of measurement sets, wherein each measurement set corresponds to at least one image in the plurality of images and each measurement set comprises Inertial Measurement Unit (IMU) measurements and available wireless measurements with correction information for the available wireless measurements;
    estimating, based, in part, on the plurality of images and the corresponding plurality of measurement sets, a 3D structural envelope of the structure and a trajectory of the UE;
    transmitting information comprising the estimated trajectory of the UE, the 3D structural envelope, the plurality of images, and the corresponding measurement sets, to a first server wirelessly coupled to the UE; and
    receiving, based, in part, on the transmitted information, a corrected trajectory of the UE registered to absolute coordinates and a 3D structural envelope of the structure registered to the absolute coordinates.

2. The method of claim 1, wherein the available wireless measurements comprise:
    Global Navigation Satellite System (GNSS) measurements comprising differentially corrected code and carrier phase observables and wherein the correction information for the wireless measurements comprises one or more of: GNSS code and carrier differential corrections, GNSS precise orbital and clock information, or GNSS atmospheric corrections.

3. The method of claim 2, wherein estimating the trajectory of the UE comprises:
    applying, for each location in a subset of the plurality of locations, one or more of the GNSS code and carrier differential corrections, the GNSS precise orbital and clock information, or the GNSS atmospheric corrections to the GNSS measurements corresponding to the location to obtain a corresponding corrected GNSS measurement;
    determining a set of corrected locations, wherein, for each location in the subset of the plurality of images, a corresponding corrected location in the set of corrected locations is obtained based on the corrected GNSS measurements; and
    determining the estimated trajectory based, in part, on the set of corrected locations.

4. The method of claim 2, wherein the correction information for the available wireless measurements is received by the UE from a second server.

5. The method of claim 2, wherein the correction information for the available wireless measurements is received by the UE from the first server.

6. The method of claim 1, wherein the available wireless measurements further comprise
    Wireless Wide Area Network (WWAN) measurements comprising one or more of:
        Observed Time Difference of Arrival (OTDOA) measurements, or
        Reference Signal Time Difference (RSTD) measurements, or
        Advanced Forward Link Trilateralation (AFLT) measurements, or
        hybrid-AFLT measurements.

7. The method of claim 1, wherein the correction information for the available wireless measurements comprises antenna pattern information for the UE.

8. The method of claim 1, wherein the corrected trajectory of the UE registered to the absolute coordinates is determined based, in part, on a closed-loop trajectory of the UE.

9. The method of claim 1, wherein receiving the corrected trajectory of the UE registered to the absolute coordinates and the 3D structural envelope of the structure registered to the absolute coordinates comprises:
receiving an outdoor map comprising the corrected trajectory and the 3D structural envelope, wherein the outdoor map comprises a plurality map layers registered to the absolute coordinates.

10. The method of claim 9, wherein the plurality of map layers includes at least two of:
a plan view map layer; or
a 3D structural map layer, with external 3D structural envelope information for neighboring structures;
a map layer with attenuation or delay of WWAN signals associated with the structure, or
a map layer with annotations for any variation in WWAN signal strength in the vicinity of the structure; or
a Line Of Sight (LOS) map layer, indicating, for each absolute coordinate in a first plurality of the absolute coordinates on the LOS map layer, corresponding antennas in a line of sight relative to the absolute coordinate.

11. The method of claim 1, wherein estimating the trajectory of the UE and the 3D structural envelope of the structure comprises:
applying Visual Simultaneous Localization and Mapping (VSLAM) techniques to a subset of the plurality of images of the structure to determine a scene geometry and a set of first 6 Degrees Of Freedom (6DOF) poses of the UE, wherein each first 6DOF pose of the UE in the set of first 6DOF poses corresponds to a distinct image in the subset of the plurality of images each first 6DOF pose being determined based on keypoints in the subset of the plurality of images; and
determining the external 3D structural envelope of the structure based, in part, on the scene geometry; and
determining the estimated trajectory based, in part, on the set of first 6DOF poses.

12. The method of claim 11, wherein determining the estimated trajectory comprises:
providing each first 6DOF pose in the set of 6DOF poses to an Extended Kalman Filter (EKF), wherein for each first 6DOF pose, the EKF determines a corresponding second 6DOF pose of the UE in the absolute coordinates, based in part, on the first 6DOF pose, the IMU measurements and the available wireless measurements.

13. A User Equipment (UE) comprising:
a camera configured to capture a plurality of images of an exterior of a structure when traversing a plurality of locations in a vicinity of the structure;
a plurality of sensors, the plurality of sensors comprising an Inertial Measurement Unit (IMU);
a wireless module configured to take wireless measurements of available wireless signals, and acquire correction information for the wireless measurements;
a processor, coupled to the camera, the plurality of sensors and the wireless module, wherein the processor is configured to:
obtain the plurality of images of the exterior of the structure;
obtain a plurality of measurement sets, wherein each measurement set corresponds to at least one image in the plurality of images, and each measurement set comprises IMU measurements and the wireless measurements with correction information for the wireless measurements;
estimate, based, in part, on the plurality of images and the corresponding plurality of measurement sets, a 3D structural envelope of the structure and a trajectory of the UE;
transmitting information comprising the estimated trajectory of the UE, and the 3D structural envelope, the plurality of images, and the corresponding measurement sets, to a first server wirelessly coupled to the UE; and
receive, based, in part, on the transmitted information, a corrected trajectory of the UE registered to absolute coordinates and a 3D structural envelope of the structure registered to the absolute coordinates.

14. The UE of claim 13, wherein the wireless measurements comprise:
Global Navigation Satellite System (GNSS) measurements comprising differentially corrected code and carrier phase observables and wherein the correction information for the wireless measurements comprises one or more of: GNSS code and carrier differential corrections, GNSS precise orbital and clock information, or GNSS atmospheric corrections.

15. The UE of claim 14, wherein, to estimate the trajectory of the UE, the processor is configured to:
apply, for each location in a subset of plurality of locations, one or more of the GNSS code and carrier differential corrections, the GNSS precise orbital and clock information, or the GNSS atmospheric corrections to the GNSS measurements corresponding to the location to obtain a corresponding corrected GNSS measurement;
determine a set of corrected locations, wherein, for each location in the subset of the plurality of images, a corresponding corrected location in the set of corrected locations is obtained based on the corrected GNSS measurements; and
determine the estimated trajectory based, in part, on the set of corrected locations.

16. The UE of claim 14, wherein the wireless module is configured to acquire the correction information for the wireless measurements from a second server.

17. The UE of claim 14, wherein:
the wireless module wireless module is configured to acquire the correction information for the wireless measurements from the first server.

18. The UE of claim 13, wherein the wireless measurements further comprise
Wireless Wide Area Network (WWAN) measurements comprising one or more of:
Observed Time Difference of Arrival (OTDOA) measurements, or Reference Signal Time Difference (RSTD) measurements, or
Advanced Forward Link Trilateralation (AFLT) measurements, or
hybrid-AFLT measurements.

19. The UE of claim 13, wherein correction information for the wireless measurements comprises antenna pattern information for the UE.

20. The UE of claim 13, wherein the corrected trajectory of the UE corresponds to a closed-loop trajectory of the UE.

21. The UE of claim 13, wherein to receive the corrected trajectory of the UE registered to the absolute coordinates and 3D structural envelope of the structure registered to the absolute coordinates, the processor is configured to:
receive an outdoor map comprising the corrected trajectory of the UE and the 3D structural envelope, wherein the outdoor map comprises a plurality of map layers registered to the absolute coordinates.

22. The UE of claim 21, wherein the plurality of map layers includes at least two of:
    a plan view map layer; or
    a 3D structural map layer, with external 3D structural envelope information for neighboring structures;
    a map layer with attenuation or delay of WWAN signals associated with the structure, or
    a map layer with annotations for any variation in WWAN signal strength in the vicinity of the structure; or
    a Line Of Sight (LOS) map layer, indicating, for each absolute coordinate in the absolute coordinates on the LOS map layer, corresponding antennas in a line of sight relative to the absolute coordinate.

23. The UE of claim 13, wherein, to estimate the trajectory of the UE and 3D structural envelope of the structure, the processor is configured to:
    apply Visual Simultaneous Localization and Mapping (VSLAM) techniques to a subset of the plurality of images of the structure to determine a scene geometry and a set of first 6 Degrees Of Freedom (6DOF) poses of the UE, wherein each first 6DOF pose of the UE in the set of first 6DOF poses corresponds to a distinct image in the subset of the plurality of images each 6DOF pose being determined based on keypoints in the subset of the plurality of images; and
    determine the external 3D structural envelope of the structure based, in part, on the scene geometry; and
    determine the estimated trajectory based, in part, on the set of first 6DOF poses.

24. The UE of claim 23, wherein, to determine the estimated trajectory of the UE, the processor is configured to:
    provide each 6DOF pose in the set of first 6DOF poses to an Extended Kalman Filter (EKF), wherein, for each first 6DOF pose, the EKF determines a corresponding second 6DOF pose of the UE in the absolute coordinates, based in part, on the first 6DOF pose, the IMU measurements and the wireless measurements.

25. A User Equipment (UE) comprising:
    imaging means configured to capture a plurality of images of an exterior of a structure when traversing a plurality of locations in a vicinity of the structure;
    sensing means, the sensing means comprising an Inertial Measurement Unit (IMU) means;
    wireless measurement means configured to take wireless measurements of available wireless signals, and acquire correction information for the wireless measurements;
    means for obtaining the plurality of images of the exterior of the structure;
    means for obtaining a plurality of measurement sets, wherein each measurement set corresponds to at least one image in the plurality of images, and each measurement set comprises IMU measurements and the wireless measurements with correction information for the wireless measurements;
    means for estimating, based, in part, on the plurality of images and the corresponding plurality of measurement sets, a 3D structural envelope of the structure and a trajectory of the UE;
    means for transmitting information comprising the estimated trajectory of the UE, the 3D structural envelope, the plurality of images, and the corresponding measurement sets, to a server wirelessly coupled to the UE; and
    means for receiving, based, in part, on the transmitted information, a corrected trajectory of the UE registered to absolute coordinates and a 3D structural envelope of the structure registered to the absolute coordinates.

26. The UE of claim 25, wherein the wireless measurements comprise:
    Global Navigation Satellite System (GNSS) measurements comprising differentially corrected code and carrier phase observables and wherein the correction information for the wireless measurements comprises one or more of: GNSS code and carrier differential corrections, GNSS precise orbital and clock information, or GNSS atmospheric corrections.

27. A non-transitory computer-readable medium comprising instructions, which, when executed by a processor, cause the processor to be configured to:
    capture a plurality of images of an exterior of a structure when traversing a plurality of locations in a vicinity of the structure;
    capture a plurality of measurement sets, wherein each measurement set corresponds to at least one image in the plurality of images and each measurement set comprises Inertial Measurement Unit (IMU) measurements and available wireless measurements with correction information for the available wireless measurements;
    estimate, based, in part, on the plurality of images and the corresponding plurality of measurement sets, a 3D structural envelope of the structure and a trajectory of the UE;
    transmit information comprising the estimated trajectory of the UE, and the 3D structural envelope, the plurality of images, and the corresponding measurement sets, to a first server wirelessly coupled to the UE; and
    receive, based, in part, on the transmitted information, a corrected trajectory of the UE registered to absolute coordinates and a 3D structural envelope of the structure registered to the absolute coordinates.

28. The computer-readable medium of claim 27, wherein the available wireless measurements comprise:
    Global Navigation Satellite System (GNSS) measurements comprising differentially corrected code and carrier phase observables and wherein the correction information for the wireless measurements comprises one or more of: GNSS code and carrier differential corrections, GNSS precise orbital and clock information, or GNSS atmospheric corrections.

29. The computer-readable medium of claim 28, wherein the instructions to estimate a trajectory of the UE cause the processor to:
    apply, for each location in a subset of the plurality of locations, one or more of: the GNSS code and carrier differential corrections, the GNSS precise orbital and clock information, or the GNSS atmospheric corrections to the GNSS measurements corresponding to the location to obtain a corresponding corrected GNSS measurement;
    determine a set of corrected locations, wherein, for each location in the subset of the plurality of images, a corresponding corrected location is determined based on the corrected GNSS measurements; and
    estimate the trajectory based, in part, on the set of corrected locations.

30. The computer-readable medium of claim 28, wherein the correction information for the available wireless measurements is received by the UE from a second server.

* * * * *